(12) United States Patent
Petrescu et al.

(10) Patent No.: US 8,055,067 B2
(45) Date of Patent: Nov. 8, 2011

(54) COLOR SEGMENTATION

(75) Inventors: Stefan Petrescu, Bucharest (RO); Mihnea Gangea, Bucharest (RO); Petronel Bigioi, Galway (IE); Alexei Pososin, Galway (IE); Alex Drimbarean, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 954 days.

(21) Appl. No.: 11/624,683

(22) Filed: Jan. 18, 2007

(65) Prior Publication Data

US 2008/0175481 A1    Jul. 24, 2008

(51) Int. Cl.
*G06K 9/00* (2006.01)

(52) U.S. Cl. ........ 382/164; 382/115; 382/118; 382/162; 382/173; 382/180

(58) Field of Classification Search .................. 382/115, 382/118, 162, 164, 173, 180
See application file for complete search history.

(56) References Cited

U.S. PATENT DOCUMENTS

| | | |
|---|---|---|
| 4,047,187 A | 9/1977 | Mashimo et al. |
| 4,285,588 A | 8/1981 | Mir |
| 4,317,991 A | 3/1982 | Stauffer |
| 4,367,027 A | 1/1983 | Stauffer |
| RE31,370 E | 9/1983 | Mashimo et al. |
| 4,448,510 A | 5/1984 | Murakoshi |
| 4,456,354 A | 6/1984 | Mizokami |
| 4,577,219 A | 3/1986 | Klie et al. |
| 4,638,364 A | 1/1987 | Hiramatsu |
| 4,646,134 A | 2/1987 | Komatsu et al. |
| 4,690,536 A | 9/1987 | Nakai et al. |
| 4,777,620 A | 10/1988 | Shimoni et al. |
| 4,796,043 A | 1/1989 | Izumi et al. |
| 4,881,067 A | 11/1989 | Watanabe et al. |
| 4,970,663 A | 11/1990 | Bedell et al. |
| 4,970,683 A | 11/1990 | Harshaw et al. |
| 4,975,969 A | 12/1990 | Tal |
| 4,978,989 A | 12/1990 | Nakano et al. |
| 5,008,946 A | 4/1991 | Ando |
| 5,016,107 A | 5/1991 | Sasson et al. |
| 5,018,017 A | 5/1991 | Sasaki et al. |
| RE33,682 E | 9/1991 | Hiramatsu |
| 5,051,770 A | 9/1991 | Cornuejols |
| 5,063,603 A | 11/1991 | Burt |
| 5,070,355 A | 12/1991 | Inoue et al. |
| 5,111,231 A | 5/1992 | Tokunaga |
| 5,130,789 A | 7/1992 | Dobbs et al. |

(Continued)

FOREIGN PATENT DOCUMENTS

EP        578508 A2    1/1994

(Continued)

OTHER PUBLICATIONS

U.S. Appl. No. 11/464,083, filed Aug. 11, 2006.

(Continued)

*Primary Examiner* — Wesley Tucker

(74) *Attorney, Agent, or Firm* — Andrew V. Smith

(57) ABSTRACT

A method of skin segmentation of a digital image is operable in an acquisition device. An image is acquired. A value indicative of a redness of a pixel of said image is compared with a face skin pixel redness criterion. The pixel is identified as a face skin pixel if said criterion is satisfied.

18 Claims, 3 Drawing Sheets

U.S. PATENT DOCUMENTS

| | | | |
|---|---|---|---|
| 5,130,935 A | 7/1992 | Takiguchi | |
| 5,150,432 A | 9/1992 | Ueno et al. | |
| 5,161,204 A | 11/1992 | Hutcheson et al. | |
| 5,164,831 A | 11/1992 | Kuchta et al. | |
| 5,164,833 A | 11/1992 | Aoki | |
| 5,164,992 A | 11/1992 | Turk et al. | |
| 5,202,720 A | 4/1993 | Fujino et al. | |
| 5,227,837 A | 7/1993 | Terashita | |
| 5,231,674 A | 7/1993 | Cleveland et al. | |
| 5,249,053 A | 9/1993 | Jain | |
| 5,274,457 A | 12/1993 | Kobayashi et al. | |
| 5,278,923 A | 1/1994 | Nazarathy et al. | |
| 5,280,530 A | 1/1994 | Trew et al. | |
| 5,291,234 A | 3/1994 | Shindo et al. | |
| 5,301,026 A | 4/1994 | Lee | |
| 5,303,049 A | 4/1994 | Ejima et al. | |
| 5,305,048 A | 4/1994 | Suzuki et al. | |
| 5,311,240 A | 5/1994 | Wheeler | |
| 5,331,544 A | 7/1994 | Lu et al. | |
| 5,335,072 A | 8/1994 | Tanaka et al. | |
| 5,353,058 A | 10/1994 | Takei | |
| 5,384,601 A | 1/1995 | Yamashita et al. | |
| 5,384,615 A | 1/1995 | Hsieh et al. | |
| 5,384,912 A | 1/1995 | Ogrinc et al. | |
| 5,400,113 A | 3/1995 | Sosa et al. | |
| 5,424,794 A | 6/1995 | McKay | |
| 5,430,809 A | 7/1995 | Tomitaka | |
| 5,432,863 A | 7/1995 | Benati et al. | |
| 5,432,866 A | 7/1995 | Sakamoto | |
| 5,438,367 A | 8/1995 | Yamamoto et al. | |
| 5,450,504 A | 9/1995 | Calia | |
| 5,452,048 A | 9/1995 | Edgar | |
| 5,455,606 A | 10/1995 | Keeling et al. | |
| 5,465,308 A | 11/1995 | Hutcheson et al. | |
| 5,488,429 A | 1/1996 | Kojima et al. | |
| 5,493,409 A | 2/1996 | Maeda et al. | |
| 5,496,106 A | 3/1996 | Anderson | |
| 5,537,516 A | 7/1996 | Sherman et al. | |
| 5,543,952 A | 8/1996 | Yonenaga et al. | |
| 5,568,187 A | 10/1996 | Okino | |
| 5,568,194 A | 10/1996 | Abe | |
| 5,576,759 A | 11/1996 | Kawamura et al. | |
| 5,629,752 A | 5/1997 | Kinjo | |
| 5,633,678 A | 5/1997 | Parulski et al. | |
| 5,638,136 A | 6/1997 | Kojima et al. | |
| 5,638,139 A | 6/1997 | Clatanoff et al. | |
| 5,649,238 A | 7/1997 | Wakabayashi et al. | |
| 5,652,669 A | 7/1997 | Liedenbaum | |
| 5,671,013 A | 9/1997 | Nakao | |
| 5,678,073 A | 10/1997 | Stephenson, III et al. | |
| 5,680,481 A | 10/1997 | Prasad et al. | |
| 5,684,509 A | 11/1997 | Hatanaka et al. | |
| 5,694,926 A | 12/1997 | DeVries et al. | |
| 5,706,362 A | 1/1998 | Yabe | |
| 5,708,866 A | 1/1998 | Leonard | |
| 5,710,833 A | 1/1998 | Moghaddam et al. | |
| 5,715,325 A | 2/1998 | Bang et al. | |
| 5,719,639 A | 2/1998 | Imamura | |
| 5,719,951 A | 2/1998 | Shackleton et al. | |
| 5,721,983 A | 2/1998 | Furutsu | |
| 5,724,456 A | 3/1998 | Boyack et al. | |
| 5,734,425 A | 3/1998 | Takizawa et al. | |
| 5,745,668 A | 4/1998 | Poggio et al. | |
| 5,748,764 A | 5/1998 | Benati et al. | |
| 5,748,784 A | 5/1998 | Sugiyama | |
| 5,751,836 A | 5/1998 | Wildes et al. | |
| 5,761,550 A | 6/1998 | Kancigor | |
| 5,764,790 A | 6/1998 | Brunelli et al. | |
| 5,764,803 A | 6/1998 | Jacquin et al. | |
| 5,771,307 A | 6/1998 | Lu et al. | |
| 5,774,129 A | 6/1998 | Poggio et al. | |
| 5,774,591 A | 6/1998 | Black et al. | |
| 5,774,747 A | 6/1998 | Ishihara et al. | |
| 5,774,754 A | 6/1998 | Ootsuka | |
| 5,781,650 A | 7/1998 | Lobo et al. | |
| 5,802,208 A | 9/1998 | Podilchuk et al. | |
| 5,802,220 A | 9/1998 | Black et al. | |
| 5,805,720 A | 9/1998 | Suenaga et al. | |
| 5,805,727 A | 9/1998 | Nakano | |
| 5,805,745 A | 9/1998 | Graf | |
| 5,812,193 A | 9/1998 | Tomitaka et al. | |
| 5,815,749 A | 9/1998 | Tsukahara et al. | |
| 5,818,975 A | 10/1998 | Goodwin et al. | |
| 5,835,616 A | 11/1998 | Lobo et al. | |
| 5,842,194 A | 11/1998 | Arbuckle | |
| 5,844,573 A | 12/1998 | Poggio et al. | |
| 5,847,714 A | 12/1998 | Naqvi et al. | |
| 5,850,470 A | 12/1998 | Kung et al. | |
| 5,852,669 A | 12/1998 | Eleftheriadis et al. | |
| 5,852,823 A | 12/1998 | De Bonet | |
| RE36,041 E | 1/1999 | Turk et al. | |
| 5,862,217 A | 1/1999 | Steinberg et al. | |
| 5,862,218 A | 1/1999 | Steinberg | |
| 5,870,138 A | 2/1999 | Smith et al. | |
| 5,892,837 A | 4/1999 | Luo et al. | |
| 5,905,807 A | 5/1999 | Kado et al. | |
| 5,911,139 A | 6/1999 | Jain et al. | |
| 5,912,980 A | 6/1999 | Hunke | |
| 5,949,904 A | 9/1999 | Delp | |
| 5,966,549 A | 10/1999 | Hara et al. | |
| 5,974,189 A | 10/1999 | Nicponski | |
| 5,978,519 A | 11/1999 | Bollman et al. | |
| 5,990,973 A | 11/1999 | Sakamoto | |
| 5,991,456 A | 11/1999 | Rahman et al. | |
| 5,991,549 A | 11/1999 | Tsuchida | |
| 5,991,594 A | 11/1999 | Froeber et al. | |
| 5,999,160 A | 12/1999 | Kitamura et al. | |
| 6,006,039 A | 12/1999 | Steinberg et al. | |
| 6,009,209 A | 12/1999 | Acker et al. | |
| 6,011,547 A | 1/2000 | Shiota et al. | |
| 6,016,354 A | 1/2000 | Lin et al. | |
| 6,028,611 A | 2/2000 | Anderson et al. | |
| 6,028,960 A | 2/2000 | Graf et al. | |
| 6,035,072 A | 3/2000 | Read | |
| 6,035,074 A | 3/2000 | Fujimoto et al. | |
| 6,036,072 A | 3/2000 | Lee | |
| 6,053,268 A | 4/2000 | Yamada | |
| 6,061,055 A | 5/2000 | Marks | |
| 6,072,094 A | 6/2000 | Karady et al. | |
| 6,097,470 A | 8/2000 | Buhr et al. | |
| 6,101,271 A | 8/2000 | Yamashita et al. | |
| 6,104,839 A | 8/2000 | Cok et al. | |
| 6,108,437 A | 8/2000 | Lin | |
| 6,115,052 A | 9/2000 | Freeman et al. | |
| 6,118,485 A | 9/2000 | Hinoue et al. | |
| 6,128,397 A | 10/2000 | Baluja et al. | |
| 6,128,398 A | 10/2000 | Kuperstein et al. | |
| 6,134,339 A | 10/2000 | Luo | |
| 6,148,092 A | 11/2000 | Qian | |
| 6,151,073 A | 11/2000 | Steinberg et al. | |
| 6,151,403 A | 11/2000 | Luo | |
| 6,172,706 B1 | 1/2001 | Tatsumi | |
| 6,173,068 B1 | 1/2001 | Prokoski | |
| 6,181,805 B1 | 1/2001 | Koike et al. | |
| 6,188,777 B1 | 2/2001 | Darrell et al. | |
| 6,192,149 B1 | 2/2001 | Eschbach et al. | |
| 6,195,127 B1 | 2/2001 | Sugimoto | |
| 6,201,571 B1 | 3/2001 | Ota | |
| 6,204,858 B1 | 3/2001 | Gupta | |
| 6,204,868 B1 | 3/2001 | Yamauchi et al. | |
| 6,233,364 B1 | 5/2001 | Krainiouk et al. | |
| 6,240,198 B1 | 5/2001 | Rehg et al. | |
| 6,246,779 B1 | 6/2001 | Fukui et al. | |
| 6,246,790 B1 | 6/2001 | Huang et al. | |
| 6,249,315 B1 | 6/2001 | Holm | |
| 6,252,976 B1 | 6/2001 | Schildkraut et al. | |
| 6,263,113 B1 | 7/2001 | Abdel-Mottaleb et al. | |
| 6,266,054 B1 | 7/2001 | Lawton et al. | |
| 6,268,939 B1 | 7/2001 | Klassen et al. | |
| 6,275,614 B1 * | 8/2001 | Krishnamurthy et al. | 382/224 |
| 6,278,491 B1 | 8/2001 | Wang et al. | |
| 6,282,317 B1 | 8/2001 | Luo et al. | |
| 6,285,410 B1 | 9/2001 | Marni | |
| 6,292,574 B1 | 9/2001 | Schildkraut et al. | |
| 6,292,575 B1 | 9/2001 | Bortolussi et al. | |
| 6,295,378 B1 | 9/2001 | Kitakado et al. | |
| 6,298,166 B1 | 10/2001 | Ratnakar et al. | |

| | | |
|---|---|---|
| 6,300,935 B1 | 10/2001 | Sobel et al. |
| 6,301,370 B1 | 10/2001 | Steffens et al. |
| 6,301,440 B1 | 10/2001 | Bolle et al. |
| 6,332,033 B1 | 12/2001 | Qian |
| 6,334,008 B2 | 12/2001 | Nakabayashi |
| 6,349,373 B2 | 2/2002 | Sitka et al. |
| 6,351,556 B1 | 2/2002 | Loui et al. |
| 6,381,345 B1 | 4/2002 | Swain |
| 6,393,136 B1 | 5/2002 | Amir et al. |
| 6,393,148 B1 | 5/2002 | Bhaskar |
| 6,396,963 B2 | 5/2002 | Shaffer et al. |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,775 B1 | 7/2002 | Kurokawa |
| 6,426,779 B1 | 7/2002 | Noguchi et al. |
| 6,429,924 B1 | 8/2002 | Milch |
| 6,433,818 B1 | 8/2002 | Steinberg et al. |
| 6,438,234 B1 | 8/2002 | Gisin et al. |
| 6,438,264 B1 | 8/2002 | Gallagher et al. |
| 6,441,854 B2 | 8/2002 | Fellegara et al. |
| 6,445,810 B2 | 9/2002 | Darrell et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,496,655 B1 | 12/2002 | Malloy Desormeaux |
| 6,501,857 B1 | 12/2002 | Gotsman et al. |
| 6,501,911 B1 | 12/2002 | Malloy Desormeaux |
| 6,502,107 B1 | 12/2002 | Nishida |
| 6,504,546 B1 | 1/2003 | Cosatto et al. |
| 6,504,942 B1 | 1/2003 | Hong et al. |
| 6,504,951 B1 | 1/2003 | Luo et al. |
| 6,505,003 B1 | 1/2003 | Malloy Desormeaux |
| 6,510,520 B1 | 1/2003 | Steinberg |
| 6,516,154 B1 | 2/2003 | Parulski et al. |
| 6,526,156 B1 | 2/2003 | Black et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,398 B2 | 8/2003 | Cooper |
| 6,614,471 B1 | 9/2003 | Ott |
| 6,614,995 B2 | 9/2003 | Tseng |
| 6,621,867 B1 | 9/2003 | Sazzad et al. |
| 6,628,833 B1 | 9/2003 | Horie |
| 6,633,655 B1 | 10/2003 | Hong et al. |
| 6,661,907 B2 | 12/2003 | Ho et al. |
| 6,678,407 B1 | 1/2004 | Tajima |
| 6,697,503 B2 | 2/2004 | Matsuo et al. |
| 6,697,504 B2 | 2/2004 | Tsai |
| 6,700,614 B1 | 3/2004 | Hata |
| 6,700,999 B1 | 3/2004 | Yang |
| 6,707,950 B1 | 3/2004 | Burns et al. |
| 6,714,665 B1 | 3/2004 | Hanna et al. |
| 6,718,051 B1 | 4/2004 | Eschbach |
| 6,724,941 B1 | 4/2004 | Aoyama |
| 6,728,401 B1 | 4/2004 | Hardeberg |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,765,686 B2 | 7/2004 | Maruoka |
| 6,778,216 B1 | 8/2004 | Lin |
| 6,786,655 B2 | 9/2004 | Cook et al. |
| 6,792,135 B1 | 9/2004 | Toyama |
| 6,792,161 B1 | 9/2004 | Imaizumi et al. |
| 6,798,834 B1 | 9/2004 | Murakami et al. |
| 6,798,913 B2 | 9/2004 | Toriyama |
| 6,801,250 B1 | 10/2004 | Miyashita |
| 6,801,642 B2 | 10/2004 | Gorday et al. |
| 6,816,156 B2 | 11/2004 | Sukeno et al. |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,859,565 B2 | 2/2005 | Baron |
| 6,873,743 B2 | 3/2005 | Steinberg |
| 6,876,755 B1 | 4/2005 | Taylor et al. |
| 6,879,705 B1 | 4/2005 | Tao et al. |
| 6,885,760 B2 | 4/2005 | Yamada et al. |
| 6,885,766 B2 | 4/2005 | Held et al. |
| 6,895,112 B2 | 5/2005 | Chen et al. |
| 6,900,840 B1 | 5/2005 | Schinner et al. |
| 6,900,882 B1 | 5/2005 | Iida |
| 6,912,298 B1 | 6/2005 | Wilensky |
| 6,934,406 B1 | 8/2005 | Nakano |
| 6,937,773 B1 | 8/2005 | Nozawa et al. |
| 6,937,997 B1 | 8/2005 | Parulski |
| 6,940,545 B1 | 9/2005 | Ray et al. |
| 6,947,601 B2 | 9/2005 | Aoki et al. |
| 6,959,109 B2 | 10/2005 | Moustafa |
| 6,965,684 B2 | 11/2005 | Chen et al. |
| 6,967,680 B1 | 11/2005 | Kagle et al. |
| 6,977,687 B1 | 12/2005 | Suh |
| 6,980,691 B2 | 12/2005 | Nesterov et al. |
| 6,984,039 B2 | 1/2006 | Agostinelli |
| 6,993,157 B1 | 1/2006 | Oue et al. |
| 7,003,135 B2 | 2/2006 | Hsieh et al. |
| 7,020,337 B2 | 3/2006 | Viola et al. |
| 7,024,051 B2 | 4/2006 | Miller et al. |
| 7,024,053 B2 | 4/2006 | Enomoto |
| 7,027,619 B2 | 4/2006 | Pavlidis et al. |
| 7,027,621 B1 | 4/2006 | Prokoski |
| 7,027,662 B2 | 4/2006 | Baron |
| 7,030,927 B2 | 4/2006 | Sasaki |
| 7,034,848 B2 | 4/2006 | Sobol |
| 7,035,456 B2 | 4/2006 | Lestideau |
| 7,035,461 B2 | 4/2006 | Luo et al. |
| 7,035,462 B2 | 4/2006 | White et al. |
| 7,035,467 B2 | 4/2006 | Nicponski |
| 7,038,709 B1 | 5/2006 | Verghese |
| 7,038,715 B1 | 5/2006 | Flinchbaugh |
| 7,039,222 B2 | 5/2006 | Simon et al. |
| 7,042,501 B1 | 5/2006 | Matama |
| 7,042,505 B1 | 5/2006 | DeLuca |
| 7,042,511 B2 | 5/2006 | Lin |
| 7,043,056 B2 | 5/2006 | Edwards et al. |
| 7,043,465 B2 | 5/2006 | Pirim |
| 7,050,607 B2 | 5/2006 | Li et al. |
| 7,057,653 B1 | 6/2006 | Kubo |
| 7,061,648 B2 | 6/2006 | Nakajima et al. |
| 7,062,086 B2 | 6/2006 | Chen et al. |
| 7,064,776 B2 | 6/2006 | Sumi et al. |
| 7,082,212 B2 | 7/2006 | Liu et al. |
| 7,088,386 B2 | 8/2006 | Goto |
| 7,099,510 B2 | 8/2006 | Jones et al. |
| 7,106,374 B1 | 9/2006 | Bandera et al. |
| 7,106,887 B2 | 9/2006 | Kinjo |
| 7,110,569 B2 | 9/2006 | Brodsky et al. |
| 7,110,575 B2 | 9/2006 | Chen et al. |
| 7,113,641 B1 | 9/2006 | Eckes et al. |
| 7,116,820 B2 | 10/2006 | Luo et al. |
| 7,119,838 B2 | 10/2006 | Zanzucchi et al. |
| 7,120,279 B2 | 10/2006 | Chen et al. |
| 7,133,070 B2 | 11/2006 | Wheeler et al. |
| 7,146,026 B2 | 12/2006 | Russon et al. |
| 7,151,843 B2 | 12/2006 | Rui et al. |
| 7,155,058 B2 | 12/2006 | Gaubatz et al. |
| 7,158,680 B2 | 1/2007 | Pace |
| 7,162,076 B2 | 1/2007 | Liu |
| 7,162,101 B2 | 1/2007 | Itokawa et al. |
| 7,171,023 B2 | 1/2007 | Kim et al. |
| 7,171,025 B2 | 1/2007 | Rui et al. |
| 7,171,044 B2 | 1/2007 | Chen et al. |
| 7,190,829 B2 | 3/2007 | Zhang et al. |
| 7,194,114 B2 | 3/2007 | Schneiderman |
| 7,200,249 B2 | 4/2007 | Okubo et al. |
| 7,216,289 B2 | 5/2007 | Kagle et al. |
| 7,218,759 B1 | 5/2007 | Ho et al. |
| 7,224,850 B2 | 5/2007 | Zhang et al. |
| 7,227,976 B1 | 6/2007 | Jung et al. |
| 7,254,257 B2 | 8/2007 | Kim et al. |

| | | | | | | |
|---|---|---|---|---|---|---|
| 7,269,292 B2 | 9/2007 | Steinberg | | 2002/0150292 A1 | 10/2002 | O'callaghan |
| 7,274,822 B2 | 9/2007 | Zhang et al. | | 2002/0150306 A1 | 10/2002 | Baron |
| 7,274,832 B2 | 9/2007 | Nicponski | | 2002/0150662 A1 | 10/2002 | Dewis et al. |
| 7,289,664 B2 | 10/2007 | Enomoto | | 2002/0159630 A1 | 10/2002 | Buzuloiu et al. |
| 7,295,233 B2 | 11/2007 | Steinberg et al. | | 2002/0168108 A1 | 11/2002 | Loui et al. |
| 7,306,337 B2 | 12/2007 | Ji et al. | | 2002/0172419 A1 | 11/2002 | Lin et al. |
| 7,310,443 B1 | 12/2007 | Kris et al. | | 2002/0176609 A1 | 11/2002 | Hsieh et al. |
| 7,315,630 B2 | 1/2008 | Steinberg et al. | | 2002/0176623 A1 | 11/2002 | Steinberg |
| 7,315,631 B1 | 1/2008 | Corcoran et al. | | 2002/0181801 A1 | 12/2002 | Needham et al. |
| 7,317,815 B2 | 1/2008 | Steinberg et al. | | 2002/0191861 A1 | 12/2002 | Cheatle |
| 7,321,391 B2 | 1/2008 | Ishige | | 2003/0007687 A1 | 1/2003 | Nesterov et al. |
| 7,321,670 B2 | 1/2008 | Yoon et al. | | 2003/0021478 A1 | 1/2003 | Yoshida |
| 7,324,670 B2 | 1/2008 | Kozakaya et al. | | 2003/0023974 A1 | 1/2003 | Dagtas et al. |
| 7,324,671 B2 | 1/2008 | Li et al. | | 2003/0025808 A1 | 2/2003 | Parulski et al. |
| 7,336,821 B2 | 2/2008 | Ciuc et al. | | 2003/0025811 A1 | 2/2003 | Keelan et al. |
| 7,336,830 B2 | 2/2008 | Porter et al. | | 2003/0025812 A1 | 2/2003 | Slatter |
| 7,352,393 B2 | 4/2008 | Sakamoto | | 2003/0035573 A1 | 2/2003 | Duta et al. |
| 7,352,394 B1 | 4/2008 | DeLuca et al. | | 2003/0044063 A1 | 3/2003 | Meckes et al. |
| 7,362,210 B2 | 4/2008 | Bazakos et al. | | 2003/0044070 A1 | 3/2003 | Fuersich et al. |
| 7,362,368 B2 | 4/2008 | Steinberg et al. | | 2003/0044176 A1 | 3/2003 | Saitoh |
| 7,369,712 B2 | 5/2008 | Steinberg et al. | | 2003/0044177 A1 | 3/2003 | Oberhardt et al. |
| 7,403,643 B2 | 7/2008 | Ianculescu et al. | | 2003/0044178 A1 | 3/2003 | Oberhardt et al. |
| 7,436,998 B2 | 10/2008 | Steinberg et al. | | 2003/0048950 A1 | 3/2003 | Savakis et al. |
| 7,437,998 B2 | 10/2008 | Burger et al. | | 2003/0052991 A1 | 3/2003 | Stavely et al. |
| 7,440,593 B1 | 10/2008 | Steinberg et al. | | 2003/0058343 A1 | 3/2003 | Katayama |
| 7,454,040 B2 | 11/2008 | Luo et al. | | 2003/0058349 A1 | 3/2003 | Takemoto |
| 7,460,694 B2 | 12/2008 | Corcoran et al. | | 2003/0059107 A1 | 3/2003 | Sun et al. |
| 7,460,695 B2 | 12/2008 | Steinberg et al. | | 2003/0059121 A1 | 3/2003 | Savakis et al. |
| 7,466,866 B2 | 12/2008 | Steinberg | | 2003/0068083 A1* | 4/2003 | Lee et al. .................. 382/164 |
| 7,469,055 B2 | 12/2008 | Corcoran et al. | | 2003/0071908 A1 | 4/2003 | Sannoh et al. |
| 7,471,846 B2 | 12/2008 | Steinberg et al. | | 2003/0084065 A1 | 5/2003 | Lin et al. |
| 7,502,494 B2 | 3/2009 | Tafuku et al. | | 2003/0086134 A1 | 5/2003 | Enomoto |
| 7,515,740 B2 | 4/2009 | Corcoran et al. | | 2003/0095197 A1 | 5/2003 | Wheeler et al. |
| 7,536,036 B2 | 5/2009 | Steinberg et al. | | 2003/0107649 A1 | 6/2003 | Flickner et al. |
| 7,551,211 B2 | 6/2009 | Taguchi et al. | | 2003/0113035 A1 | 6/2003 | Cahill et al. |
| 7,565,030 B2 | 7/2009 | Steinberg et al. | | 2003/0117501 A1 | 6/2003 | Shirakawa |
| 7,574,016 B2 | 8/2009 | Steinberg et al. | | 2003/0118216 A1 | 6/2003 | Goldberg |
| 7,612,794 B2 | 11/2009 | He et al. | | 2003/0123713 A1 | 7/2003 | Geng |
| 7,616,233 B2 | 11/2009 | Steinberg et al. | | 2003/0123751 A1 | 7/2003 | Krishnamurthy et al. |
| 7,620,214 B2 | 11/2009 | Chen et al. | | 2003/0137597 A1 | 7/2003 | Sakamoto et al. |
| 7,623,733 B2 | 11/2009 | Hirosawa | | 2003/0142209 A1 | 7/2003 | Yamazaki et al. |
| 7,630,527 B2 | 12/2009 | Steinberg et al. | | 2003/0142285 A1 | 7/2003 | Enomoto |
| 7,634,109 B2 | 12/2009 | Steinberg et al. | | 2003/0151674 A1 | 8/2003 | Lin |
| 7,636,485 B2 | 12/2009 | Simon et al. | | 2003/0161506 A1 | 8/2003 | Velazquez et al. |
| 7,652,693 B2 | 1/2010 | Miyashita et al. | | 2003/0169907 A1 | 9/2003 | Edwards et al. |
| 7,684,630 B2 | 3/2010 | Steinberg | | 2003/0174773 A1 | 9/2003 | Comaniciu et al. |
| 7,693,311 B2 | 4/2010 | Steinberg et al. | | 2003/0190072 A1 | 10/2003 | Adkins et al. |
| 7,702,136 B2 | 4/2010 | Steinberg et al. | | 2003/0194143 A1 | 10/2003 | Iida |
| 7,733,388 B2 | 6/2010 | Asaeda | | 2003/0202715 A1 | 10/2003 | Kinjo |
| 7,809,162 B2 | 10/2010 | Steinberg et al. | | 2003/0223622 A1 | 12/2003 | Simon et al. |
| 2001/0005222 A1 | 6/2001 | Yamaguchi | | 2004/0001616 A1 | 1/2004 | Gutta et al. |
| 2001/0015760 A1 | 8/2001 | Fellegara et al. | | 2004/0017481 A1 | 1/2004 | Takasumi et al. |
| 2001/0028731 A1 | 10/2001 | Covell et al. | | 2004/0022435 A1 | 2/2004 | Ishida |
| 2001/0031142 A1 | 10/2001 | Whiteside | | 2004/0027593 A1 | 2/2004 | Wilkins |
| 2001/0038712 A1 | 11/2001 | Loce et al. | | 2004/0032512 A1 | 2/2004 | Silverbrook |
| 2001/0038714 A1 | 11/2001 | Masumoto et al. | | 2004/0032526 A1 | 2/2004 | Silverbrook |
| 2001/0052937 A1 | 12/2001 | Suzuki | | 2004/0033071 A1 | 2/2004 | Kubo |
| 2002/0019859 A1 | 2/2002 | Watanabe | | 2004/0037460 A1 | 2/2004 | Luo et al. |
| 2002/0041329 A1 | 4/2002 | Steinberg | | 2004/0041121 A1 | 3/2004 | Yoshida et al. |
| 2002/0051571 A1 | 5/2002 | Jackway et al. | | 2004/0041924 A1 | 3/2004 | White et al. |
| 2002/0054224 A1 | 5/2002 | Wasula et al. | | 2004/0046878 A1 | 3/2004 | Jarman |
| 2002/0081003 A1 | 6/2002 | Sobol | | 2004/0047491 A1 | 3/2004 | Rydbeck |
| 2002/0085088 A1 | 7/2002 | Eubanks | | 2004/0056975 A1 | 3/2004 | Hata |
| 2002/0090133 A1 | 7/2002 | Kim et al. | | 2004/0057623 A1 | 3/2004 | Schuhrke et al. |
| 2002/0093577 A1 | 7/2002 | Kitawaki et al. | | 2004/0057705 A1 | 3/2004 | Kohno |
| 2002/0093633 A1 | 7/2002 | Milch | | 2004/0057715 A1 | 3/2004 | Tsuchida et al. |
| 2002/0102024 A1 | 8/2002 | Jones et al. | | 2004/0093432 A1 | 5/2004 | Luo et al. |
| 2002/0105662 A1 | 8/2002 | Patton et al. | | 2004/0095359 A1 | 5/2004 | Simon et al. |
| 2002/0106114 A1 | 8/2002 | Yan et al. | | 2004/0114796 A1 | 6/2004 | Kaku |
| 2002/0114513 A1 | 8/2002 | Hirao | | 2004/0114797 A1 | 6/2004 | Meckes |
| 2002/0114535 A1 | 8/2002 | Luo | | 2004/0114829 A1 | 6/2004 | LeFeuvre et al. |
| 2002/0118287 A1 | 8/2002 | Grosvenor et al. | | 2004/0114904 A1 | 6/2004 | Sun et al. |
| 2002/0126893 A1 | 9/2002 | Held et al. | | 2004/0119851 A1 | 6/2004 | Kaku |
| 2002/0131770 A1 | 9/2002 | Meier et al. | | 2004/0120391 A1 | 6/2004 | Lin et al. |
| 2002/0136433 A1 | 9/2002 | Lin | | 2004/0120399 A1 | 6/2004 | Kato |
| 2002/0136450 A1 | 9/2002 | Chen et al. | | 2004/0120598 A1 | 6/2004 | Feng |
| 2002/0141640 A1 | 10/2002 | Kraft | | 2004/0125387 A1 | 7/2004 | Nagao et al. |
| 2002/0141661 A1 | 10/2002 | Steinberg | | 2004/0126086 A1 | 7/2004 | Nakamura et al. |
| 2002/0150291 A1* | 10/2002 | Naf et al. .................. 382/162 | | 2004/0141657 A1 | 7/2004 | Jarman |

| | | |
|---|---|---|
| 2004/0150743 A1 | 8/2004 | Schinner |
| 2004/0160517 A1 | 8/2004 | Iida |
| 2004/0165215 A1 | 8/2004 | Raguet et al. |
| 2004/0170397 A1 | 9/2004 | Ono |
| 2004/0175021 A1 | 9/2004 | Porter et al. |
| 2004/0179719 A1 | 9/2004 | Chen et al. |
| 2004/0184044 A1 | 9/2004 | Kolb et al. |
| 2004/0184670 A1 | 9/2004 | Jarman et al. |
| 2004/0196292 A1 | 10/2004 | Okamura |
| 2004/0196503 A1 | 10/2004 | Kurtenbach et al. |
| 2004/0213476 A1 | 10/2004 | Luo et al. |
| 2004/0218832 A1 | 11/2004 | Luo et al. |
| 2004/0223063 A1 | 11/2004 | DeLuca et al. |
| 2004/0223649 A1 | 11/2004 | Zacks et al. |
| 2004/0227978 A1 | 11/2004 | Enomoto |
| 2004/0228505 A1 | 11/2004 | Sugimoto |
| 2004/0228542 A1 | 11/2004 | Zhang et al. |
| 2004/0233299 A1 | 11/2004 | Ioffe et al. |
| 2004/0233301 A1 | 11/2004 | Nakata et al. |
| 2004/0234156 A1 | 11/2004 | Watanabe et al. |
| 2004/0239779 A1 | 12/2004 | Washisu |
| 2004/0240747 A1 | 12/2004 | Jarman et al. |
| 2004/0258308 A1 | 12/2004 | Sadovsky et al. |
| 2004/0264744 A1 | 12/2004 | Zhang et al. |
| 2005/0001024 A1 | 1/2005 | Kusaka et al. |
| 2005/0013479 A1 | 1/2005 | Xiao et al. |
| 2005/0013602 A1 | 1/2005 | Ogawa |
| 2005/0013603 A1 | 1/2005 | Ichimasa |
| 2005/0018923 A1 | 1/2005 | Messina et al. |
| 2005/0024498 A1 | 2/2005 | Iida et al. |
| 2005/0031224 A1 | 2/2005 | Prilutsky et al. |
| 2005/0036044 A1 | 2/2005 | Funakura |
| 2005/0041121 A1 | 2/2005 | Steinberg et al. |
| 2005/0046730 A1* | 3/2005 | Li .............................. 348/333.12 |
| 2005/0047655 A1 | 3/2005 | Luo et al. |
| 2005/0047656 A1 | 3/2005 | Luo et al. |
| 2005/0053279 A1 | 3/2005 | Chen et al. |
| 2005/0058340 A1 | 3/2005 | Chen et al. |
| 2005/0058342 A1 | 3/2005 | Chen et al. |
| 2005/0062856 A1 | 3/2005 | Matsushita |
| 2005/0063083 A1 | 3/2005 | Dart et al. |
| 2005/0068446 A1 | 3/2005 | Steinberg et al. |
| 2005/0068452 A1 | 3/2005 | Steinberg et al. |
| 2005/0069208 A1 | 3/2005 | Morisada |
| 2005/0074164 A1 | 4/2005 | Yonaha |
| 2005/0074179 A1 | 4/2005 | Wilensky |
| 2005/0078191 A1 | 4/2005 | Battles |
| 2005/0089218 A1 | 4/2005 | Chiba |
| 2005/0104848 A1 | 5/2005 | Yamaguchi et al. |
| 2005/0105780 A1 | 5/2005 | Ioffe |
| 2005/0117132 A1 | 6/2005 | Agostinelli |
| 2005/0128518 A1 | 6/2005 | Tsue et al. |
| 2005/0129278 A1 | 6/2005 | Rui et al. |
| 2005/0129331 A1 | 6/2005 | Kakiuchi et al. |
| 2005/0134719 A1 | 6/2005 | Beck |
| 2005/0140801 A1 | 6/2005 | Prilutsky et al. |
| 2005/0147278 A1 | 7/2005 | Rui et al. |
| 2005/0151943 A1 | 7/2005 | Iida |
| 2005/0163498 A1 | 7/2005 | Battles et al. |
| 2005/0168965 A1 | 8/2005 | Yoshida |
| 2005/0185054 A1 | 8/2005 | Edwards et al. |
| 2005/0196067 A1 | 9/2005 | Gallagher et al. |
| 2005/0200736 A1 | 9/2005 | Ito |
| 2005/0207649 A1 | 9/2005 | Enomoto et al. |
| 2005/0212955 A1 | 9/2005 | Craig et al. |
| 2005/0219385 A1 | 10/2005 | Terakawa |
| 2005/0219608 A1 | 10/2005 | Wada |
| 2005/0220346 A1 | 10/2005 | Akahori |
| 2005/0220347 A1 | 10/2005 | Enomoto et al. |
| 2005/0226499 A1 | 10/2005 | Terakawa |
| 2005/0232490 A1 | 10/2005 | Itagaki et al. |
| 2005/0238230 A1 | 10/2005 | Yoshida |
| 2005/0243348 A1 | 11/2005 | Yonaha |
| 2005/0275721 A1 | 12/2005 | Ishii |
| 2005/0275734 A1 | 12/2005 | Ikeda |
| 2005/0276481 A1 | 12/2005 | Enomoto |
| 2005/0280717 A1 | 12/2005 | Sugimoto |
| 2005/0286766 A1 | 12/2005 | Ferman |
| 2006/0006077 A1 | 1/2006 | Mosher et al. |
| 2006/0008152 A1 | 1/2006 | Kumar et al. |
| 2006/0008171 A1 | 1/2006 | Petschnigg et al. |
| 2006/0008173 A1 | 1/2006 | Matsugu et al. |
| 2006/0017825 A1 | 1/2006 | Thakur |
| 2006/0018517 A1 | 1/2006 | Chen et al. |
| 2006/0029265 A1 | 2/2006 | Kim et al. |
| 2006/0038916 A1 | 2/2006 | Knoedgen et al. |
| 2006/0039690 A1 | 2/2006 | Steinberg et al. |
| 2006/0045352 A1 | 3/2006 | Gallagher |
| 2006/0050300 A1 | 3/2006 | Mitani et al. |
| 2006/0050933 A1 | 3/2006 | Adam et al. |
| 2006/0056655 A1 | 3/2006 | Wen et al. |
| 2006/0066628 A1 | 3/2006 | Brodie et al. |
| 2006/0082847 A1 | 4/2006 | Sugimoto |
| 2006/0093212 A1 | 5/2006 | Steinberg et al. |
| 2006/0093213 A1 | 5/2006 | Steinberg et al. |
| 2006/0093238 A1 | 5/2006 | Steinberg et al. |
| 2006/0098867 A1 | 5/2006 | Gallagher |
| 2006/0098875 A1 | 5/2006 | Sugimoto |
| 2006/0098890 A1 | 5/2006 | Steinberg et al. |
| 2006/0119832 A1 | 6/2006 | Iida |
| 2006/0120599 A1 | 6/2006 | Steinberg et al. |
| 2006/0133699 A1 | 6/2006 | Widrow et al. |
| 2006/0140455 A1 | 6/2006 | Costache et al. |
| 2006/0147192 A1 | 7/2006 | Zhang et al. |
| 2006/0150089 A1 | 7/2006 | Jensen et al. |
| 2006/0153472 A1 | 7/2006 | Sakata et al. |
| 2006/0177100 A1 | 8/2006 | Zhu et al. |
| 2006/0177131 A1 | 8/2006 | Porikli |
| 2006/0187305 A1 | 8/2006 | Trivedi et al. |
| 2006/0203106 A1 | 9/2006 | Lawrence et al. |
| 2006/0203107 A1 | 9/2006 | Steinberg et al. |
| 2006/0203108 A1 | 9/2006 | Steinberg et al. |
| 2006/0204034 A1 | 9/2006 | Steinberg et al. |
| 2006/0204052 A1 | 9/2006 | Yokouchi |
| 2006/0204054 A1 | 9/2006 | Steinberg et al. |
| 2006/0204055 A1 | 9/2006 | Steinberg et al. |
| 2006/0204056 A1 | 9/2006 | Steinberg et al. |
| 2006/0204057 A1 | 9/2006 | Steinberg |
| 2006/0204058 A1 | 9/2006 | Kim et al. |
| 2006/0204110 A1 | 9/2006 | Steinberg et al. |
| 2006/0210264 A1 | 9/2006 | Saga |
| 2006/0215924 A1 | 9/2006 | Steinberg et al. |
| 2006/0221408 A1 | 10/2006 | Fukuda |
| 2006/0227997 A1 | 10/2006 | Au et al. |
| 2006/0228037 A1 | 10/2006 | Simon et al. |
| 2006/0245624 A1 | 11/2006 | Gallagher et al. |
| 2006/0257047 A1 | 11/2006 | Kameyama et al. |
| 2006/0268150 A1 | 11/2006 | Kameyama et al. |
| 2006/0269270 A1 | 11/2006 | Yoda et al. |
| 2006/0280380 A1 | 12/2006 | Li |
| 2006/0285754 A1 | 12/2006 | Steinberg et al. |
| 2006/0291739 A1 | 12/2006 | Li et al. |
| 2007/0018966 A1 | 1/2007 | Blythe et al. |
| 2007/0047768 A1 | 3/2007 | Gordon et al. |
| 2007/0053614 A1 | 3/2007 | Mori et al. |
| 2007/0070440 A1 | 3/2007 | Li et al. |
| 2007/0071347 A1 | 3/2007 | Li et al. |
| 2007/0091203 A1 | 4/2007 | Peker et al. |
| 2007/0098303 A1 | 5/2007 | Gallagher et al. |
| 2007/0110305 A1 | 5/2007 | Corcoran et al. |
| 2007/0110417 A1 | 5/2007 | Itokawa |
| 2007/0116379 A1 | 5/2007 | Corcoran et al. |
| 2007/0116380 A1 | 5/2007 | Ciuc et al. |
| 2007/0122056 A1 | 5/2007 | Steinberg et al. |
| 2007/0133863 A1 | 6/2007 | Sakai et al. |
| 2007/0133901 A1 | 6/2007 | Aiso |
| 2007/0154095 A1 | 7/2007 | Cao et al. |
| 2007/0154096 A1 | 7/2007 | Cao et al. |
| 2007/0154189 A1 | 7/2007 | Harradine et al. |
| 2007/0160307 A1 | 7/2007 | Steinberg et al. |
| 2007/0172126 A1 | 7/2007 | Kitamura |
| 2007/0189606 A1 | 8/2007 | Ciuc et al. |
| 2007/0189748 A1 | 8/2007 | Drimbarean et al. |
| 2007/0189757 A1 | 8/2007 | Steinberg et al. |
| 2007/0195174 A1 | 8/2007 | Oren |
| 2007/0201724 A1 | 8/2007 | Steinberg et al. |
| 2007/0201725 A1 | 8/2007 | Steinberg et al. |
| 2007/0201726 A1 | 8/2007 | Steinberg et al. |

| Publication No. | Date | Inventor |
|---|---|---|
| 2007/0263104 A1 | 11/2007 | DeLuca et al. |
| 2007/0263119 A1 | 11/2007 | Shum et al. |
| 2007/0263928 A1 | 11/2007 | Akahori |
| 2007/0273504 A1 | 11/2007 | Tran |
| 2007/0296833 A1 | 12/2007 | Corcoran et al. |
| 2008/0002060 A1 | 1/2008 | DeLuca et al. |
| 2008/0013798 A1 | 1/2008 | Ionita et al. |
| 2008/0013799 A1 | 1/2008 | Steinberg et al. |
| 2008/0013800 A1 | 1/2008 | Steinberg et al. |
| 2008/0019565 A1 | 1/2008 | Steinberg |
| 2008/0031498 A1 | 2/2008 | Corcoran et al. |
| 2008/0037827 A1 | 2/2008 | Corcoran et al. |
| 2008/0037838 A1 | 2/2008 | Ianculescu et al. |
| 2008/0037839 A1 | 2/2008 | Corcoran et al. |
| 2008/0037840 A1 | 2/2008 | Steinberg et al. |
| 2008/0043121 A1 | 2/2008 | Prilutsky et al. |
| 2008/0043122 A1 | 2/2008 | Steinberg et al. |
| 2008/0049970 A1 | 2/2008 | Ciuc et al. |
| 2008/0055433 A1 | 3/2008 | Steinberg et al. |
| 2008/0075385 A1 | 3/2008 | David et al. |
| 2008/0112599 A1 | 5/2008 | Nanu et al. |
| 2008/0143854 A1 | 6/2008 | Steinberg et al. |
| 2008/0144965 A1 | 6/2008 | Steinberg et al. |
| 2008/0144966 A1 | 6/2008 | Steinberg et al. |
| 2008/0186389 A1 | 8/2008 | DeLuca et al. |
| 2008/0205712 A1 | 8/2008 | Ionita et al. |
| 2008/0211937 A1 | 9/2008 | Steinberg et al. |
| 2008/0219517 A1 | 9/2008 | Blonk et al. |
| 2008/0232711 A1 | 9/2008 | Prilutsky et al. |
| 2008/0240555 A1 | 10/2008 | Nanu et al. |
| 2008/0266419 A1 | 10/2008 | Drimbarean et al. |
| 2008/0267461 A1 | 10/2008 | Ianculescu et al. |
| 2008/0292193 A1 | 11/2008 | Bigioi et al. |
| 2008/0316327 A1 | 12/2008 | Steinberg et al. |
| 2008/0316328 A1 | 12/2008 | Steinberg et al. |
| 2008/0317339 A1 | 12/2008 | Steinberg et al. |
| 2008/0317357 A1 | 12/2008 | Steinberg et al. |
| 2008/0317378 A1 | 12/2008 | Steinberg et al. |
| 2008/0317379 A1 | 12/2008 | Steinberg et al. |
| 2009/0002514 A1 | 1/2009 | Steinberg et al. |
| 2009/0003652 A1 | 1/2009 | Steinberg et al. |
| 2009/0003661 A1 | 1/2009 | Ionita et al. |
| 2009/0003708 A1 | 1/2009 | Steinberg et al. |
| 2009/0052749 A1 | 2/2009 | Steinberg et al. |
| 2009/0052750 A1 | 2/2009 | Steinberg et al. |
| 2009/0080713 A1 | 3/2009 | Bigioi et al. |
| 2009/0087030 A1 | 4/2009 | Steinberg et al. |
| 2009/0141144 A1 | 6/2009 | Steinberg |
| 2009/0175609 A1 | 7/2009 | Tan |
| 2009/0179998 A1 | 7/2009 | Steinberg et al. |
| 2009/0196466 A1 | 8/2009 | Capata et al. |
| 2009/0208056 A1 | 8/2009 | Corcoran et al. |
| 2009/0244296 A1 | 10/2009 | Petrescu et al. |
| 2009/0245693 A1 | 10/2009 | Steinberg et al. |
| 2009/0263022 A1 | 10/2009 | Petrescu et al. |
| 2010/0026831 A1 | 2/2010 | Ciuc et al. |
| 2010/0026832 A1 | 2/2010 | Ciuc et al. |
| 2010/0026833 A1 | 2/2010 | Ciuc et al. |
| 2010/0039525 A1 | 2/2010 | Steinberg et al. |
| 2010/0053368 A1 | 3/2010 | Nanu et al. |
| 2010/0054533 A1 | 3/2010 | Steinberg et al. |
| 2010/0054549 A1 | 3/2010 | Steinberg et al. |
| 2010/0092039 A1 | 4/2010 | Steinberg et al. |
| 2010/0165140 A1 | 7/2010 | Steinberg |
| 2010/0165150 A1 | 7/2010 | Steinberg et al. |
| 2010/0188525 A1 | 7/2010 | Steinberg et al. |
| 2010/0188530 A1 | 7/2010 | Steinberg et al. |
| 2010/0220899 A1 | 9/2010 | Steinberg et al. |
| 2010/0271499 A1 | 10/2010 | Steinberg et al. |
| 2010/0272363 A1 | 10/2010 | Steinberg et al. |
| 2011/0002506 A1 | 1/2011 | Ciuc et al. |
| 2011/0002545 A1 | 1/2011 | Steinberg et al. |
| 2011/0013043 A1 | 1/2011 | Corcoran et al. |
| 2011/0013044 A1 | 1/2011 | Steinberg et al. |
| 2011/0025886 A1 | 2/2011 | Steinberg et al. |

FOREIGN PATENT DOCUMENTS

| | | |
|---|---|---|
| EP | 884694 A1 | 12/1998 |
| EP | 911759 A2 | 4/1999 |
| EP | 984386 A2 | 3/2000 |
| EP | 911759 A3 | 6/2000 |
| EP | 1128316 A1 | 8/2001 |
| EP | 1199672 A2 | 4/2002 |
| EP | 1229486 A1 | 8/2002 |
| EP | 1288858 A1 | 3/2003 |
| EP | 1288859 A1 | 3/2003 |
| EP | 1288860 A1 | 3/2003 |
| EP | 1293933 A1 | 3/2003 |
| EP | 1296510 A2 | 3/2003 |
| EP | 1398733 A1 | 3/2004 |
| EP | 1429290 A2 | 6/2004 |
| EP | 1441497 A2 | 7/2004 |
| EP | 1453002 A2 | 9/2004 |
| EP | 1478169 A2 | 11/2004 |
| EP | 1528509 A2 | 5/2005 |
| EP | 1626569 A1 | 2/2006 |
| EP | 979487 B1 | 3/2006 |
| EP | 1785914 A1 | 5/2007 |
| EP | 1858255 A1 | 11/2007 |
| EP | 1887511 A1 | 2/2008 |
| EP | 1429290 B1 | 7/2008 |
| EP | 2033142 A2 | 3/2009 |
| EP | 2052349 A1 | 4/2009 |
| EP | 2188759 A1 | 5/2010 |
| GB | 841609 A | 7/1960 |
| GB | 2370438 A1 | 6/2002 |
| GB | 2379819 A | 3/2003 |
| IE | 80161 A2 | 9/2008 |
| JP | 3205989 A2 | 9/1991 |
| JP | 4192681 A2 | 7/1992 |
| JP | 5224271 A2 | 9/1993 |
| JP | 5260360 A2 | 10/1993 |
| JP | 7281285 A2 | 10/1995 |
| JP | 9214839 A2 | 8/1997 |
| JP | 2000-134486 A2 | 5/2000 |
| JP | 2002-247596 A2 | 8/2002 |
| JP | 2002-271808 A2 | 9/2002 |
| JP | 2003-030647 A2 | 1/2003 |
| JP | 25164475 A2 | 6/2005 |
| JP | 26005662 A2 | 1/2006 |
| JP | 2006072770 A | 3/2006 |
| JP | 26254358 A2 | 9/2006 |
| WO | WO9802844 A1 | 1/1998 |
| WO | WO9917254 A1 | 4/1999 |
| WO | WO9933684 A2 | 7/1999 |
| WO | WO 00/76398 A1 | 12/2000 |
| WO | WO0133497 A1 | 5/2001 |
| WO | WO0171421 A1 | 9/2001 |
| WO | WO0192614 A1 | 12/2001 |
| WO | WO0245003 A1 | 6/2002 |
| WO | WO-02052835 A2 | 7/2002 |
| WO | WO03026278 A1 | 3/2003 |
| WO | WO03028377 A1 | 4/2003 |
| WO | WO03071484 A1 | 8/2003 |
| WO | WO2004034696 A1 | 4/2004 |
| WO | WO2005015896 A1 | 2/2005 |
| WO | WO2005041558 A1 | 5/2005 |
| WO | WO2005076217 A2 | 8/2005 |
| WO | WO2005076217 A3 | 8/2005 |
| WO | WO2005087994 A1 | 9/2005 |
| WO | WO2005109853 A1 | 11/2005 |
| WO | WO2006011635 A1 | 2/2006 |
| WO | WO2006018056 A1 | 2/2006 |
| WO | WO2006045441 A1 | 5/2006 |
| WO | WO2007057063 A1 | 5/2007 |
| WO | WO2007057064 A1 | 5/2007 |
| WO | WO2007093199 A2 | 8/2007 |
| WO | WO2007093199 A3 | 8/2007 |
| WO | WO-2007095477 A2 | 8/2007 |
| WO | WO-2007095477 A3 | 8/2007 |
| WO | WO-2007095483 A2 | 8/2007 |
| WO | WO-2007095553 A2 | 8/2007 |
| WO | WO-2007095553 A3 | 8/2007 |
| WO | WO 2007/128117 A1 | 11/2007 |
| WO | WO 2007142621 A1 | 12/2007 |
| WO | WO-2008015586 A2 | 2/2008 |
| WO | WO-2008015586 A3 | 2/2008 |
| WO | WO2008017343 A1 | 2/2008 |

| | | |
|---|---|---|
| WO | WO-2008018887 A1 | 2/2008 |
| WO | WO-2008023280 A2 | 2/2008 |
| WO | WO2008054422 A2 | 5/2008 |
| WO | WO-2008104549 A2 | 9/2008 |
| WO | WO2008107002 A1 | 9/2008 |
| WO | WO2008107112 A2 | 9/2008 |
| WO | WO2008109644 A2 | 9/2008 |
| WO | WO2008109644 A3 | 9/2008 |
| WO | WO2008131823 A1 | 11/2008 |
| WO | WO2008150285 A1 | 12/2008 |
| WO | WO2008157792 A1 | 12/2008 |
| WO | WO2009039876 A1 | 4/2009 |
| WO | WO2010012448 A2 | 2/2010 |
| WO | WO2010017953 A1 | 2/2010 |
| WO | WO2010025908 A1 | 3/2010 |
| WO | WO2010012448 A3 | 6/2010 |
| WO | WO2011000841 A1 | 1/2011 |
| WO | WO2010136593 A3 | 2/2011 |

OTHER PUBLICATIONS

U.S. Appl. No. 60/821,165, filed Aug. 2, 2006.

Aoki, Hiroyuki et al., "An Image Storage System Using Complex-Valued Associative Memories, Abstract printed from http://csdl.computer.org/comp/proceedings/icpr/2000/0750/02/07502626abs.htm", International Conference on Pattern Recognition (ICPR '00), 2000, vol. 2.

Batur et al., "Adaptive Active Appearance Models", IEEE Transactions on Image Processing, 2005, pp. 1707-1721, vol. 14—Issue 11.

Beraldin, J.A. et al., "Object Model Creation from Multiple Range Images: Acquisition, Calibration, Model Building and Verification, Abstract printed from http://csdl.computer.org/comp/proceedings/nrc/1997/7943/00/79430326abs.htm", International Conference on Recent Advances in 3-D Digital Imaging and Modeling, 1997.

Beymer, David, "Pose-Invariant face Recognition Using Real and Virtual Views, A.I. Technical Report No. 1574", Mass. Institute of Tech. Artificial Intelligence Laboratory, 1996, pp. 1-176.

Bradski Gary et al., "Learning-Based Computer Vision with Intel's Open Source Computer Vision Library", Intel Technology, 2005, pp. 119-130, vol. 9—Issue 2.

Buenaposada, J., "Efficiently estimating 1-3,16 facial expression and illumination in appearance—based tracking, Retrieved from the Internet: URL:http://www.bmva.ac.uk/bmvc/2006/ [retrieved on Sep. 1, 2008]", Proc. British machine vision conference, 2006.

Chang, T., "Texture Analysis and Classification with Tree-Structured Wavelet Transform", IEEE Transactions on Image Processing, 1993, pp. 429-441, vol. 2—Issue 4.

Cootes T. et al., "Modeling Facial Shape and Appearance, S. Li and K. K. Jain (Eds.): "Handbook of face recognition", XP002494037", 2005, Chapter 3, Springer.

Cootes, T.F. et al., "A comparative evaluation of active appearance model algorithms", Proc. 9th British Machine Vision Conference. British Machine Vision Association, 1998, pp. 680-689.

Cootes, T.F. et al., "On representing edge structure for model matching", Proc. IEEE Computer Vision and Pattern Recognition, 2001, pp. 1114-1119.

Corcoran, P. et al., "Automatic Indexing of Consumer Image Collections Using Person Recognition Techniques", Digest of Technical Papers. International Conference on Consumer Electronics, 2005, pp. 127-128.

Costache, G. et al., "In-Camera Person-Indexing of Digital Images", Digest of Technical Papers. International Conference on Consumer Electronics, 2006, pp. 339-340.

Crowley, J. et al., "Multi-modal tracking of faces for video communication, http://citeseer.ist.psu.edu/crowley97multimodal.html", In Comp. Vision and Patent Recog., 1997.

Dalton, John. "Digital Cameras and Electronic Color Image Acquisition, Abstract printed from http://csdl.computer.org/comp/procceedings/compcon/1996/7414/00/74140431abs.htm", COMPC0N Spring '96—41st IEEE International Conference, 1996.

Demirkir, C. et al., "Face detection using boosted tree classifier stages", Proceedings of the IEEE 12th Signal Processing and Communications Applications Conference, 2004, pp. 575-578.

Donner, Rene et al., "Fast Active Appearance Model Search Using Canonical Correlation Analysis", IEEE Transactions on Pattern Analysis and Machine Intelligence, 2006, pp. 1690-1694, vol. 28—Issue 10.

Drimbarean, A.F. et al., "Image Processing Techniques to Detect and Filter Objectionable Images based on Skin Tone and Shape Recognition", International Conference on Consumer Electronics, 2001, pp. 278-279.

Edwards, G.J. et al., "Advances in active appearance models", International Conference on Computer Vision (ICCV'99), 1999, pp. 137-142.

Edwards, G.J. et al., "Learning to identify and track faces in image sequences, Automatic Face and Gesture Recognition", IEEE Comput. Soc, 1998, pp. 260-265.

Feraud, R. et al., "A Fast and Accurate Face Detector Based on Neural Networks", IEEE Transactions on Pattern Analysis and Machine Intelligence, 2001, pp. 42-53, vol. 23—Issue 1.

Fernandez, Anna T. et al., "Synthetic Elevation Beamforming and Image Acquisition Capabilities Using an 8x 128 1.75D Array, Abstract Printed from http://www.ieee-uffc.org/archive/uffc/trans/toc/abs/03/t0310040.htm", The Technical Institute of Electrical and Electronics Engineers.

Froba, B. et al., "Face detection with the modified census transform", Proceedings of The Sixth IEEE International Conference on Automatic Face and Gesture Recognition, 2004. pp. 91-96.

Froba, B. et al., "Real time face detection, Kauai, Hawai Retrieved from the Internet:URL:http://www.embassi.de/publi/veroeffent/Froeba.pdf [retrieved on Oct. 23, 2007]", Dept. of Applied Electronics, Proceedings of lasted "Signal and Image Processing", 2002, pp. 1-6.

Garnaoui, H.H. et al., "Visual Masking and the Design of Magnetic Resonance Image Acquisition, Abstract printed from http://csdl.computer.org/comp/proceedings/icip/1995/7310/01/73100625abs.htm", International Conference on Image Processing, 1995, vol. 1.

Gaubatz, Matthew et al., "Automatic Red-Eye Detection and Correction", IEEE ICIP, Proceedings 2002 International Conference on Image Processing, 2002. pp. 1-804-1-807, vol. 2—Issue 3.

Gerbrands, J., "On the Relationships Between SVD, KLT, and PCA", Pattern Recognition, 1981, pp. 375-381, vol. 14, Nos. 1-6.

Goodall, C., "Procrustes Methods in the Statistical Analysis of Shape, Stable URL:http://www.jstor.org/stable/2345744", Journal of the Royal Statistical Society. Series B (Methodological), 1991, pp. 285-339, vol. 53—Issue 2, Blackwell Publishing for the Royal Statistical Society.

Hou, Xinwen et al., "Direct Appearance Models", IEEE, 2001, pp. 1-828-1-833.

Hu, Wen-Chen et al., "A Line String Image Representation for Image Storage and Retrieval, Abstract printed from http://csdl.computer.oro/comp/proceedings/icmcs/1997/7819/00/78190434abs.htm", International Conference on Multimedia Computing and systems, 1997.

Huang et al., "Image Indexing Using Color Correlograms", Proceedings of the 1997 Conference on Computer Vision and Pattern Recognition (CVPR '97), 1997, pp. 762.

Huang, J. et al., "Detection of human faces using decision trees, http://doLieeecomputersociety.org/10.1109/Recognition", 2nd International Conference on Automatic Face and Gesture Recognition (FG '96), IEEE Xplore, 2001. p. 248.

Huber, Reinhold et al., "Adaptive Aperture Control for Image Acquisition, Abstract printed from http://csdl.computer.org/comp/proceedings/wacv/2002/1858/00/18580320abs.htm. cited by other", Sixth IEEE Workshop on Applications of Computer Vision, 2002.

Jebara, Tony S. et al., "3D Pose Estimation and Normalization for Face Recognition, a Thesis submitted to the Faculty of Graduate Studies and Research in Partial fulfillment of the requirements of the degree of Bachelor of Engineering". Department of Electrical Engineering, 1996, pp. 1-121, McGill University.

Jones, M et al., "Fast multi-view face detection, http://www.merl.com/papers/docs/TR2003-96.pdf", Mitsubishi Electric Research Lab, 2003, 10 pgs.

Kang, Sing Bing et al., "A Multibaseline Stereo System with Active Illumination and Real-Time Image Acquisition, Abstract printed from http://csdl.computer.org/comp/proceedings/iccv/1995/7042/00/70420088abs.htm", Fifth International Conference on Computer Vision, 1995.

Kita, Nobuyuki et al., "Archiving Technology for Plant Inspection Images Captured by Mobile Active Cameras—4D Visible Memory, Abstract printed from http://csdl.computer.org/comp/proceedings/3dpvt/2002/1521/00/15210208abs.htm", 1st International Symposium on 3D Data Processing Visualization and Transmission (3DPVT '02), 2002.

Kouzani, A.Z., "Illumination-Effects Compensation in Facial Images Systems", Man and Cybernetics, IEEE SMC '99 Conference Proceedings, 1999, pp. VI-840-VI-844, vol. 6.

Kozubek, Michal et al., "Automated Multi-view 3D Image Acquisition in Human Genome Research, Abstract printed from http://csdl.computer.org/comp/proceedings/3pvt/2002/1521/00/15210091abs.htm", 1st International Symposium on 3D Data Processing Visualization and Transmission (3DPVT '02), 2002.

Krishnan, Arun, "Panoramic Image Acquisition, Abstract printed from http://csdl.computer.org/comp/proceedings/cvpr/1996/7258/00/72580379abs.hun", Conference on Computer Vision and Pattern Recognition (CVPR '96), 1996.

Lai, J.H. et al., "Face recognition using holistic Fourier in variant features, http://digitalimaging.inf.brad.ac.uk/publication/pr34-1.pdf.", Pattern Recognition, 2001, pp. 95-109, vol. 34.

Lei et al.. "A CBIR Method Based on Color-Spatial Feature", IEEE 10th Ann. Int. Conf., 1999.

Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.

Matkovic, Kresimir et al., "The 3D Wunderkammer an Indexing by Placing Approach to the Image Storage and Retrieval, Abstract printed from http://csdl.computer.org/comp/proceedings/tocg/2003/1942/00/19420034abs.htm", Theory and Practice of Computer Graphics, 2003, University of Birmingham.

Matthews, I. et al., "Active appearance models revisited, Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.

Mekuz, N. et al., "Adaptive Step Size Window Matching for Detection", Proceedings of the 18th International Conference on Pattern Recognition, 2006, pp. 259-262, vol. 2.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005, pp. 245-250.

Nordstrom, M.M. et al., "The IMM face database an annotated dataset of 240 face images, http://www2.imm.dtu.dk/pubdb/p.php?3160". Informatics and Mathematical Modelling, 2004.

Ohta, Y-I et al., "Color Information for Region Segmentation, XP008026458", Computer Graphics and Image Processing, 1980, pp. 222-241, vol. 13—Issue 3, Academic Press.

Park, Daechul et al., "Lenticular Stereoscopic Imaging and Displaying Techniques with no Special Glasses. Abstract printed from http://csdl.computer.org/comp/proceedings/icip/1995/7310/03/73103137abs.htm", International Conference on Image Processing, 1995, vol. 3.

PCT International Search Report and Written Opinion of the International Searching Authority, or the Declaration, for PCT Application No, PCT/US2006/021393, filed Jun. 2, 2006, paper dated Mar. 29, 2007. 12 pgs.

PCT International Search Report and Written Opinion of the International Searching Authority, or the Declaration, for PCT Application No, PCT/US2006/060392, filed Oct. 31, 2006, paper dated Sep. 19, 2008, 9 pgs.

PCT Invitation to Pay Additional Fees and, Where Applicable Protest Fee, for PCT Application No. PCT/EP2008/001578, paper dated Jul. 8, 2008, 5 Pages.

PCT Notification of Transmittal of the International Search Report and the Written Opinion of the International Searching Authority, or the Declaration, for PCT Application No. PCT/EP2007/006540, Nov. 8, 2007. 11 pgs.

PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/EP2008/052329, dated Sep. 15. 2008, 12 pages.

PCT Notification of Transmittal of the International Search Report and the Written Opinion of the International Searching Authority, or the Declaration, for PCT Application No. PCT/IB2007/003724, dated Aug. 28. 2008, 9 pages.

Romdhani, S. et al., "Face Identification by Fitting a 3D Morphable Model using linear Shape and Texture Error Functions, XP003018283", European Conf. on Computer Vision. 2002, pp. 1-15.

Rowley, Henry A. et al., "Neural network-based face detection, ISSN: 0162-8828, DOI: 10.1109/34.655647, Posted online: Aug. 6, 2002. http://ieeexplore.ieee.org/xpl/freeabs_all.jsp?arnumber-655647andisnumber-14286", IEEE Transactions on Pattern Analysis and Machine Intelligence, 1998, pp. 23-38, p. 92, vol. 20—Issue 1.

Ryu, Hanjin et al., "Coarse-to-Fine Classification for Image-Based Face Detection", Image and video retrieval lecture notes in Computer science, 2006, pp. 291-299, vol. 4071, Springer-Verlag.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Sharma, G. et al., "Digital color imaging, [Online]. Available: citeseer.ist.psu.edu/sharma97digital.html", IEEE Transactions on Image Processing, 1997, pp. 901-932, vol. 6—Issue 7.

Shock, D. et al., "Comparison of Rural Remote Site Production of Digital Images Employing a film Digitizer or a Computed Radiography (CR) System, Abstract printed from http://csdl.computer.org/comp/proceedings/imac/1995/7560/00/75600071abs.htm", 4th International Conference on Image Management and Communication ( IMAC '95), 1995.

Sim, T. et al., "The CMU Pose. Illumination, and Expression (PIE) Database of Human Faces Robotics Institute, Tech. Report, CMU-RI-TR-01-02", 2001, 18 pgs, Carnegie Mellon University.

Sim, T. et al., "The CMU Pose, Illumination, and Expression (PIE) database, Automatic Face and Gesture Recognition", Fifth IEEE Intl. Conf, IEEE Piscataway, NJ, USA, 2002, 6 pages.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01/07501778abs.htm", International Conference on Pattern Recognition (ICPR '00), 2000, vol. 1.

Smeraldi, F. et al., "Facial feature detection by saccadic exploration of the Gabor decomposition, XP010586874", Image Processing, ICIP 98. Proceedings International Conference on Chicago, IL, USA, IEEE Comput. Soc. 1998, pp. 163-167, vol. 3.

Soriano, M. et al., "Making Saturated Facial Images Useful Again, XP002325961, ISSN: 0277-786X", Proceedings of The Spie, 1999, pp. 113-121, vol. 3826.

Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.

Stegmann, M.B. et al., "Multi-band modelling of appearance. XP009104697", Image and Vision Computing, 2003, pp. 61-67, vol. 21—Issue 1.

Stricker et al., "Similarity of color images", SPIE Proc, 1995, pp. 1-12, vol. 2420.

Sublett, J.W. et al., "Design and Implementation of a Digital Teleultrasound System for Real-Time Remote Diagnosis, Abstract printed from http://csdl.computer.org/comp/proceedings/cbms/1995/7117/00/71170292abs.htm", Eight Annual IEEE Symposium on Computer-Based Medical Systems (CBMS '95), 1995.

Tang, Yuan Y. et al., "Information Acquisition and Storage of Forms in Document Processing, Abstract printed from http://csdl.computer.

org/comp/proceedings/icdar/1997/7898/00/78980170abs.htm", 4th International Conference Document Analysis and Recognition, 1997, vol. I and II.

Tjahyadi et al., "Application of the DCT Energy Histogram for Face Recognition", Proceedings of the 2nd Intl Conference on Information Technology for Application, 2004, pp. 305-310.

Tkalcic, M. et al., "Colour spaces perceptual, historical and applicational background, ISBN: 0-7803-7763-X", IEEE, EUROCON, 2003. pp. 304-308, vol. 1.

Turk, Matthew et al., "Eigenfaces for Recognition", Journal of Cognitive Neuroscience, 1991, 17 pgs, vol. 3—Issue 1.

Twins Crack Face Recognition Puzzle, Internet article http://www.cnn.com/2003/TECH/ptech/03/10/israel.twins.reut/ index.html, printed Mar. 10, 2003, 3 pages.

U.S. Appl. No. 11/554,539, filed Oct. 30, 2006, entitled Digital Image Processing Using Face Detection and Skin Tone Information.

Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.

Viola, P. et al., "Robust Real-Time Face Detection", International Journal of Computer Vision, 2004, pp. 137-154, vol. 57—Issue 2, Kluwer Academic Publishers.

Vuylsteke, P. et al., "Range Image Acquisition with a Single Binary-Encoded Light Pattern, abstract printed from http://csdl.computer.org/comp/trans/tp/1990/02/i0148abs.htm", IEEE Transactions on Pattern Analysis and Machine Intelligence, 1990, 1 page.

Wan, S.J. et al., "Variance-based color image quantization for frame buffer display", S. K. M. Wong Color Research and Application, 1990, pp. 52-58, vol. 15—Issue 1.

Xin He et al., "Real-Time Human Face Detection in Color Image", International Conference on Machine Learning and Cybernetics, 2003, pp. 2915-2920, vol. 5.

Yang, Ming-Hsuan et al., "Detecting Faces in Images: A Survey, ISSN:0162-8828, http://portal.acm.org/citation.cfm?id=505621andcoll=GUIDEanddl=GUIDEandCFID=680-9268andCFTOKEN=82843223.", IEEE Transactions on Pattern Analysis and Machine intelligence archive, 2002, pp. 34-58, vol. 24—Issue 1, IEEE Computer Society.

Zhang, Jun et al., "Face Recognition: Eigenface, Elastic Matching, and Neural Nets", Proceedings of the IEEE, 1997, pp. 1423-1435, vol. 85—Issue 9.

Zhao, W. et al., "Face recognition: A literature survey, ISSN: 0360-0300, http://portal.acm.org/citation.cfm?id=954342andcoll=GUIDEanddl=GUIDEandCFID=680-9268andCFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

Co-pending U.S. Appl. No. 12/790,594, filed May 28, 2010.
Co-pending U.S. Appl. No. 12/825,280, filed Jun. 28, 2010.
Co-pending U.S. Appl. No. 12/843,805, filed Jul. 26, 2010.
Final Office Action mailed Mar 23, 2010, for U.S. Appl. No. 11/688,236 filed Mar. 19, 2007.
Final Office Action mailed Nov. 18, 2009, for U.S. Appl. No. 11/554,539 filed Oct. 30, 2006.

Machin, et al., "Real Time Facial Motion Analysis for Virtual Teleconferencing," IEEE, 1996, pp. 340-344.

Ming, et al., "Human Face Orientation Estimation Using Symmetry and Feature Points Analysis," IEEE, 2000, pp. 1419-1422.

Non-Final Office Action mailed Apr. 2, 2010, for U.S. Appl. No. 10/608,784, filed Jun. 26, 2003.
Non-Final Office Action mailed Apr. 30, 2010, for U.S. Appl. No. 11/765,899, filed Jun. 20, 2007.
Non-Final Office Action mailed Aug. 2, 2010, for U.S. Appl. No. 11/688,236, filed Mar. 19, 2007.
Non-Final Office Action mailed Aug. 19, 2009, for U.S. Appl. No. 11/773,815, filed Jul. 5, 2007.
Non-Final Office Action mailed Aug. 20, 2009, for U.S. Appl. No. 11/773,855, filed Jul. 5, 2007.
Non-Final Office Action mailed Jan. 20, 2010, for U.S. Appl. No. 12/262,024, filed Oct. 30, 2008.
Non-Final Office Action mailed Jun. 16, 2010, for U.S. Appl. No. 12/482,305, filed Jun. 10, 2009.
Non-Final Office Action mailed Jun. 22, 2010, for U.S. Appl. No. 12/055,958, filed Mar. 26, 2008.
Non-Final Office Action mailed Jun. 23, 2010, for U.S. Appl. No. 11/941,156, filed Nov. 18, 2007.
Non-Final Office Action mailed May. 12, 2010, for U.S. Appl. No. 11/554,539, filed Oct. 30, 2007.
Non-Final Office Action mailed Sep. 8, 2009, for U.S. Appl. No. 11/688,236, filed Mar. 19, 2007.
Notice of Allowance mailed Aug. 23, 2010, for U.S. Appl. No. 12/262,024, filed Oct. 30, 2008.
Notice of Allowance mailed Jun. 10, 2010, for U.S. Appl. No. 12/262,024, filed Oct. 30, 2008.
Notice of Allowance mailed Sep. 28, 2009, for U.S. Appl. No. 12/262,037, filed Oct. 30, 2008.
PCT Notification of Transmittal of the International Search Report and the Written Opinion of the International Searching Authority, or the Declaration, for PCT Application No. PCT/EP2009/005461, dated Apr. 20, 2010, 12 pages.

Yao, Christina: "Image Cosmetics: An automatic Skin Exfoliation Framework on Static Images" UCSB Four Eyes Lab Imaging, Interaction, and Innovative Interfaces Publications Thesis, Master of Science in Media Arts and Technology Dec. 2005, pp. 1-83, Retrieved from the Internet: URL: http://ilab.cs.ucsb.edu/publications/YaoMS.pdf.

Agrawal A. et al., "Removing photography artifacts using gradient projection and flash-exposure sampling" ACM Transactions on Graphics , 2005, pp. 828-835.

Combier, Nathalie et al., "Removal of Defects on Flash Radiographic Images by Fuzzy Combination, Conference: Machine Vision Applications in Industrial Inspection III, http://rlinks2.dialog.com/NASApp/ChannelWEB/DialogProServlet?ChName=engineering", Proceedings of SPIE—The International Society for Optical Engineering, Society of Photo-Optical Instrumentation, 1995, pp. 301-312.

Corcoran, P. et al., "Automated In-Camera Detection of Flash-Eye Defects", IEEE Transactions on Consumer Electronics, 2005, pp. 11-17, vol. 51—Issue 1.

Cucchiara, R. et al., "Detection of Luminosity Profiles of Elongated Shapes", International Conference on Image Processing, 1996, pp. 635-638, vol. 3.

Deng, Ya-Feng et al., "Fast and Robust face detection in video, http://rlinks2.dialog.com/NASApp/ChannelWEB/DialogProServlet?ChName=engineering", International Conference on Machine Learning and Cybernetics, 2005.

EPO Communication pursuant to Article 94(3) EPC, for European Patent Application No. 05 792 584.4, paper dated May 13, 2008, 8 pages.

European Patent Office, Communication pursuant to Article 94(3) EPC for Application No. 04763763.2, dated Mar. 7, 2008, 7 pages.

European Patent Office, Communication pursuant to Article 96(2) EPC for Application No. 04763763.2, dated Aug. 29, 2006, 4 pages.

Final Office Action mailed Apr. 26, 2010, for U.S. Appl. No. 10/773,092 filed, Feb. 4, 2004.
Final Office Action mailed Apr. 26, 2010, for U.S. Appl. No. 11/690,834 filed, Mar. 25, 2007.
Final Office Action mailed Apr. 26, 2010, for U.S. Appl. No. 11/772,427, filed Feb. 2, 2007.
Final Office Action mailed Apr. 26, 2010, for U.S. Appl. No. 12/035,416, filed Feb. 21, 2008.
Final Office Action mailed Feb. 1, 2011, for U.S. Appl. No. 12/881,182, filed Sep. 19, 2010.
Final Office Action mailed Feb. 4, 2011, for U.S. Appl. No. 11/761,647, filed Jun. 12, 2007.
Final Office Action mailed Mar. 24, 2010, for U.S. Appl. No. 11/462,035, filed Aug. 2, 2006.
Final Office Action mailed Nov. 9, 2010, for U.S. Appl. No. 11/462,035, filed Aug. 2, 2006.
Final Office Action mailed Nov. 20, 2009, for U.S. Appl. No. 12/192,897, filed Aug. 15, 2008.

Final Office Action mailed Oct. 13, 2010, for U.S. Appl. No. 11/765,899, filed Jun. 20, 2007.
Final Office Action mailed Sep. 1, 2009, for U.S. Appl. No. 11/841,855, filed Aug. 20, 2007.
Final Office Action mailed Sep. 1, 2010, for U.S. Appl. No. 10/608,784, filed Jun. 26, 2003.
Final Office Action mailed Sep. 22, 2010, for U.S. Appl. No. 11/688,236, filed Mar. 19, 2007.
Gangaputra, Sachin et al., "A Unified Stochastic Model for Detecting and Tracking Faces, http://portal.acm.org/citation. cfm?id=1068818& coll=GUIDE&dl=GUIDE&CF-ID=6809268& CFTOKEN=82843223", Proceedings of the The 2nd Canadian Conference on Computer and Robot Vision (CRV 2005), 2005, pp. 306-313, vol. 00, IEEE Computer Society.
Han, T. et al., "Detection and Correction of abnormal Pixels in Hyperion Images", IEEE International Symposium on Geoscience and Remote Sensing, 2002, pp. 1327-1330, vol. 3.
Harguess J, et al., "A case for the average-half-face in 2D and 3D for face recognition," Computer Vision And Pattern Recognition Workshops, 2009, IEEE Computer Society Conference on, IEEE, Piscataway, NJ, USA, 07-12.
Hayashi, S. et al., "A Detection Technique for Degraded Face Images", Conference on Computer Vision and Pattern Recognition, 2006, pp. 1506 1512, vol. 2, IEEE Computer Society.
Heisele, B. et al., "Hierarchical Classification and Feature Reduction for Fast Face Detection with Support Vector Machines", Pattern Recognition, 2003, pp. 2007-2017, vol. 36—Issue 9, Elsevier.
Iivarinen, J. et al., "Content-Based Retrieval of Defect Images, http://www.cs.tut.fi/.aboutavisa/digger/Publications/acivs02.pdf", Proceedings of Advanced Concepts for Intelligent Vision, Laboratory of Computer Information Science, 2002.
Ioffe, S., "Red eye detection with machine learning", Proceedings 2003 International Conference on Image Processing, 2003, pp. 871-874, vol. 2—Issue 3.
Isukapalli, Ramana et al., "Learning a dynamic classification method to detect faces and identify facial expression, http://rlinks2.dialog.com/NASApp/ChannelWEB/DialogProServlet?ChName=engineering", International Workshop on Analysis and Modelling of Faces and Gestures, AMFG 2005, in Lecture Notes in Computer Science, 2005, vol. 3723.
Ito, M., "An Automated System for LSI Fine Pattern Inspection Based on Comparison of Sem Images and Cad Data", IEEE International Conference on Robotics and Automation, 1995, pp. 544-549, vol. 1.
Jin, B. et al., "Modeling and Analysis of Soft-Test/Repair for CCD-Based Digital X-Ray Systems", Instrumentation and Measurement, IEEE Transactions, 2003, pp. 1713-1721, vol. 52—Issue 6.
Moghaddam, Baback et al., "Bayesian Modeling of Facial Similarity, http://citeseer.ist.psu.edu/article/moghaddam98bayesian.html", Advances in Neural Information Processing Systems (NIPS 1998), 1998, pp. 910-916.
Nayak et al., "Automatic illumination correction for scene enhancement and objection tracking, XP005600656, ISSN: 0262-8856", Image and Vision Computing, 2006, pp. 949-959, vol. 24—Issue 9.
Nguyen, Karlene et al., "Differences in the Infrared Bright Pupil Response of Human Eyes", Proceedings of the 2002 symposium on Eye tracking research & applications, 2002, pp. 133-138.
Non-Final Office Action mailed Aug. 30, 2010, for U.S. Appl. No. 11/841,855, filed Aug. 20, 2007.
Non-Final Office Action mailed Aug. 31, 2009, for U.S. Appl. No. 11/462,035, filed Aug. 2, 2006.
Non-Final Office Action mailed Aug. 5, 2010, for U.S. Appl. No. 11/462,035, filed Aug. 2, 2006.
Non-Final Office Action mailed Dec. 7, 2010, for U.S. Appl. No. 12/206,617, filed Sep. 8, 2008.
Non-Final Office Action mailed Dec. 10, 2010, for U.S. Appl. No. 11/761,647, filed Jun. 12, 2007.
Non-Final Office Action mailed Jul. 14, 2009, for U.S. Appl. No. 12/192,897, filed Aug. 15, 2008.
Non-Final Office Action mailed Mar. 9, 2010, for U.S. Appl. No. 12/192,897, filed Aug. 15, 2008.
Non-Final Office Action mailed May. 3, 2010, for U.S. Appl. No. 12/187,763, filed Aug. 7, 2008.
Non-Final Office Action mailed May. 4, 2010, for U.S. Appl. No. 12/192,335, filed Aug. 15, 2008.
Non-Final Office Action mailed Nov. 9, 2010, for U.S. Appl. No. 12/637,664, filed Dec. 14, 2009.
Non-Final Office Action mailed Oct. 5, 2009, for U.S. Appl. No. 10/919,226, filed Aug. 16, 2004.
Non-Final Office Action mailed Oct. 7, 2009, for U.S. Appl. No. 12/119,614, filed May 13, 2008.
Non-Final Office Action mailed Oct. 29, 2009, for U.S. Appl. No. 12/194,148, filed Aug. 19, 2008.
Non-Final Office Action mailed Sep. 17, 2010, for U.S. Appl. No. 11/690,834, filed Mar. 25, 2007.
Non-Final Office Action mailed Sep. 21, 2010, for U.S. Appl. No. 10/773,092, filed Feb. 4, 2004.
Non-Final Office Action mailed Sep. 28, 2010, for U.S. Appl. No. 11/752,925, filed May. 24, 2007.
Notice of Allowance mailed Dec. 17, 2010, for U.S. Appl. No. 11/765,899, filed Jun. 20, 2007.
Notice of Allowance mailed Feb. 1, 2010, for U.S. Appl. No. 10/919,226, filed Aug. 16, 2004.
Notice of Allowance mailed Feb. 19, 2010, for U.S. Appl. No. 12/119,614, filed May 13, 2008.
Notice of Allowance mailed Feb. 19, 2010, for U.S. Appl. No. 12/194,148, filed Aug. 19, 2008.
Notice of Allowance mailed Jun. 27, 2010, for U.S. Appl. No. 12/192,897, filed Aug. 15, 2008.
Notice of Allowance mailed Nov. 18, 2009, for U.S. Appl. No. 11/282,954, filed Nov. 18, 2005.
Notice of Allowance mailed Oct. 5, 2010, for U.S. Appl. No. 12/262,071, filed Oct. 30, 2008.
Notice of Allowance mailed Oct. 13, 2010, for U.S. Appl. No. 12/482,305, filed Jun. 10, 2009.
Notice of Allowance mailed Oct. 15, 2010, for U.S. Appl. No. 11/554,539, filed Oct. 30, 2006.
Notice of Allowance mailed Oct. 22, 2010, for U.S. Appl. No. 12/187,763, filed Aug. 7, 2008.
Notice of Allowance mailed Oct. 22, 2010, for U.S. Appl. No. 12/262,061, filed Oct. 30, 2008.
Notice of Allowance mailed Oct. 28, 2010, for U.S. Appl. No. 12/055,958, filed Mar. 26, 2008.
Notice of Allowance mailed Oct. 28, 2010, for U.S. Appl. No. 12/192,335, filed Aug. 15, 2008.
Notice of Allowance mailed Oct. 28, 2010, for U.S. Appl. No. 11/690,834, filed Mar. 25, 2007.
Notice of Allowance mailed Sep. 2, 2010, for U.S. Appl. No. 12/262,071, filed Oct. 30, 2008.
Notice of Allowance mailed Sep 3, 2010, for U.S. Appl. No. 12/262,061, filed Oct. 30, 2008.
Notice of Allowance mailed Sep. 8, 2010, for U.S. Appl. No. 11/554,539, filed Oct. 30, 2006.
Patent Abstracts of Japan, publication No. 2000050062, Image Input Device, application No. 10-217124, published Feb. 18, 2000, 1 page.
PCT International Preliminary Report on Patentability for PCT Application No. PCT/EP2005/005907, dated Nov. 15, 2006, 8 pages.
PCT International Preliminary Report on Patentability for PCT Application PCT/EP2004/008706, dated Feb. 6, 2006, 7 pages.
PCT International Preliminary Report on Patentability for PCT Application PCT/EP2004/010199, dated Apr. 3, 2006, 7 pages.
PCT International Preliminary Report on Patentability (IPRP) for PCT Application PCT/EP2005/011010, dated Jan. 23, 2007, 18 pages.
PCT International Preliminary Report on Patentability (IPRP) for PCT Application PCT/EP2007/009763, dated Sep. 11, 2009, 8 pages.
PCT International Search Report and the Written Opinion of the International Searching Authority, for PCT Application No. PCT/EP2004/0008706, dated Nov. 19, 2004, 9 pages.
PCT International Search Report and the Written Opinion of the International Searching Authority, for PCT Application No. PCT/EP2005/0001171, dated Jan. 27, 2006, 9 pages.
PCT International Search Report and the Written Opinion of the International Searching Authority, for PCT Application No. PCT/EP2005/0005907, dated Aug. 1, 2005, 10 pages.

PCT International Search Report and the Written Opinion of the International Searching Authority, for PCT Application No. PCT/EP2005/0011010, dated Jan. 23, 2006, 10 pages.
PCT International Search Report and the Written Opinion of the International Searching Authority, for PCT Application No. PCT/EP2006/0008342, dated Dec. 28, 2006, 8 pages.
PCT International Search Report and the Written Opinion of the International Searching Authority, for PCT Application No. PCT/EP2006/0008358, dated Jul. 5, 2006, 8 pages.
PCT International Search Report and the Written Opinion of the International Searching Authority, for PCT Application No. PCT/EP2007/0006540, dated Nov. 8, 2007, 9 pages.
PCT International Search Report and the Written Opinion of the International Searching Authority, for PCT Application No. PCT/EP2008/0001510, dated May 29, 2008, 11 pages.
PCT International Search Report and the Written Opinion of the International Searching Authority, for PCT Application No. PCT/EP2008/0008437, dated Sep. 8, 2008, 16 pages.
PCT International Search Report and the Written Opinion of the International Searching Authority, for PCT Application No. PCT/EP2009/0051081, dated Sep. 8, 2008, 16 pages.
PCT International Search Report and the Written Opinion of the International Searching Authority, for PCT Application No. PCT/IB2007/0003724, dated Aug. 28, 2008, 7 pages.
PCT International Search Report and the Written Opinion of the International Searching Authority, for PCT Application No. PCT/US2006/0021393, dated Mar. 29, 2007, 6 pages.
PCT International Search Report and the Written Opinion of the International Searching Authority, for PCT Application No. PCT/US2006/0060392, dated Sep. 19, 2006, 5 pages.
PCT International Search Report and the Written Opinion of the International Searching Authority, for PCT Application No. PCT/US2008/0055864, dated Jul. 30, 2008, 6 pages.
PCT International Search Report and the Written Opinion of the International Searching Authority, for PCT Application No. PCT/US2008/0055964, dated Jul. 30, 2008, 6 pages.
PCT International Search Report and Written Opinion of the International Searching Authority for PCT Application No. PCT/EP2004/008706, dated Nov. 19, 2004, 13 pages.
PCT International Search Report and Written Opinion of the International Searching Authority for PCT Application No. PCT/EP2005/005033, dated Aug. 4, 2005, 13 pages.
PCT Invitation to Pay Additional Fees and, Where Applicable, Protest Fee, for PCT Application No. PCT/EP2010/059228, dated Aug. 12, 2010, 6 pages.
PCT Notification Concerning Transmittal of International Preliminary Report on Patentability, for PCT Application No. PCT/US2007/062090, dated Aug. 28, 2008, 6 pages.
PCT Notification of Transmittal of the International Search Report and the Written Opinion of the International Searching Authority, or the Declaration, for PCT Application No. PCT/EP2006/008358, Dec. 5, 2006, 14 pages.
PCT Notification of Transmittal of the International Search Report and the Written Opinion of the International Searching Authority, or the Declaration, for PCT Application No. PCT/EP2007/005330, filed Jun. 18, 2007, paper dated Sep. 28, 2007, 11 pages.
PCT Notification of Transmittal of the International Search Report and the Written Opinion of the International Searching Authority, or the Declaration, for PCT Application No. PCT/EP2007/009763, paper dated Jun. 17, 2008, 11 pages.
PCT Notification of Transmittal of the International Search Report and the Written Opinion of the International Searching Authority, or the Declaration, for PCT Application No. PCT/EP2009/005809, dated Nov. 24, 2009, 12 pages.
PCT Notification of Transmittal of the International Search Report and the Written Opinion of the International Searching Authority, or the Declaration, for PCT Application No. PCT/EP2009/006361, dated Nov. 11, 2009, 10 pages.
PCT Notification of Transmittal of the International Search Report and the Written Opinion of the International Searching Authority, or the Declaration for PCT Application No. PCT/US07/62090 issued Mar. 10, 2008, 10 pages.
PCT Notification of Transmittal of the International Search Report and the Written Opinion of the International Searching Authority, or the Declaration for PCT Application No. PCT/US2006/032959, dated Mar. 6, 2007, 8 pages.
PCT Notification of Transmittal of the International Search Report and the Written Opinion of the International Searching Authority, or the Declaration, for PCT Application No. PCT/US2008/055964, paper dated Jul. 30, 2008, 8 Pages.
PCT Notification of Transmittal of the International Search Report and the Written Opinion of the International Searching Authority, or the Declaration, for PCT Application No. PCT/US2008/067746, dated Sep. 10, 2008, 8 pages.
PCT Notification of Transmittal of the International Search Report and the Written Opinion of the International Searching Authority, or the Declaration for PCT/EP/2005/011010, dated Jan. 23, 2006, 14 pages.
PCT Notification of Transmittal of the International Search Report and the Written Opinion of the International Searching Authority, or the Declaration for PCT/EP/2005/05907, dated Aug. 1, 2005, 12 pages.
PCT Notification of Transmittal of the International Search Report and the Written Opinion of the International Searching Authority, or the Declaration, for PCT/EP2004/010199, paper dated Dec. 13, 2004, 13 pages.
PCT Notification of Transmittal of the International Search Report and the Written Opinion of the International Searching Authority, or the Declaration (PCT/EP2006/008342), dated Dec. 28, 2006.
PCT Notification of Transmittal of the International Search Report and Written Opinion of the International Searching Authority for PCT Application No. PCT/EP2005/001171, dated Jan. 27, 2006, 11 pages.
PCT Partial International Search Report for Application No. PCT/EP2009/051081, dated Apr. 29, 2009, 7 pages.
Plotnikov, Yuri et al., "Advanced Image Processing for Defect Visualization in Infrared Thermography, http://citeseer.ist.psu.edu/plotnikov98advanced.html", NASA Langley Research Center, M.S. Posted: ACM Portal, 1998.
Plotnikov, Yuri et al., Winfree, "Visualization of Subsurface Defects in Composites Using a Focal Plane Array Infrared Camera, http://citeseer.ist.psu.edu/357066.html", NASA Langley Research Center, 1999.
Roux, Sebastien et al., "Embedded Convolutional Face Finder,Multimedia and Expo, XP031032828, ISBN: 978-1-4244-0366-0", IEEE International Conference on IEEE, 2006, pp. 285-288.
Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.
Shen, Jianhong, "Inpainting and the Fundamental Problem of Image Processing", 2002, 6 pages.
Smolka, B. et al., "Towards Automatic Redeye Effect Removal, XP004416063", Pattern Recognition Letters, 2003, pp. 1767-1785, vol. 24—Issue 11, North-Holland Publ.
Song, Hong et al., "Face detection and segmentation for video surveillance Language: Chinese. http://rlinks2.dialog.com/NASApp/ChannelWEB/DialogProServlet?ChName=engineering", Binggong Xuebao/Acta Armamentarii, 2006, pp. 252-257, vol. 27—Issue 2.
Tan, Yap-Peng et al., Robust Sequential Approach for the Detection of Defective Pixels in an Image Sensor, IEEE International Conference on Acoustics, Speech, and Signal Processing, 1999, pp. 2239-2242, vol. 4, http://ieeexplorejeee.org/search/freesrchabstract.jsp?arnumber=758382&isnumber=16342&punumber=6110&k2dockey=758382©ieeecnfs&query=%28%28%28%28images+and+defects+and+correction%29%29%29%29+%3Cin%3E.
Tatsutoshi Kitajima (JP04-192681 English Translation; Electronic Camera, Jul. 10, 1992).
Toet, A., Multiscale Color Image Enhancement, International Conference on Image Processing and its Applications, 1992, pp. 583-585, Posted online: 200208-06 18:09:24.0 http://ieeexplore.ieee.org/search/freesrchabstract.jsp? arnumber=146865&isnumber=3917& punumber=1197&k2dockey =146865©ieecnfs& query= %28%28images+and+defects+and+luminance%29%29+%3Cin%3E+metadata&pos=1.

Translation of Hiroshi et al. JP05-224271, Mar. 1993, Japan Publication.

Turkan, Mehmet et al., Human face detection in video using edge projections, Conference: Visual Information Processing XV, Proceedings of SPIE—The International Society for Optical Engineering Visual Information Processing, 2006, vol. 6246, http://rlinks2.dialog.com/NASApp/ChannelWEB/DialogProServlet?ChName=engineering.

United Kingdom Search Report dated May 22, 2007, issued in Application No. GB 0701957.3.

U.S. Appl. No. 10/170,511, filed Jun. 12, 2002, inventor Michael J. DeLuca.

U.S. Appl. No. 10/772,767, filed Feb. 4, 2004, by inventors Michael J. DeLuca, et al.

U.S. Appl. No. 11/217,788, filed Aug. 30, 2005, inventors Eran Steinberg, et al.

Willamowski, J. et al., "Probabilistic Automatic Red Eye Detection and Correction", The 18th International Conference on Pattern Recognition (ICPR'06), 2006, pp. 762-765, vol. 3, IEEE Computer Society.

Yang M.H., Ahuja N., "Detecting Human Faces in Color Images," 1998, Beckman Institute, 127-130.

Yang, Ming Hsuan et al., "Face Detection and Gesture Recognition for Human-Computer Interaction", 2004, p. 33-p. 35, Kluwer Academic.

Co-pending U.S. Appl. No. 11/464,083, filed Aug. 11, 2006.
Co-pending U.S. Appl. No. 11/554,539, filed Oct. 30, 2006.
Co-pending U.S. Appl. No. 60/773,714, filed Feb. 14, 2006.
Co-pending U.S. Appl. No. 60/803,980, filed Jun. 5, 2006.
Co-pending U.S. Appl. No. 60/804,546, filed Jun. 12, 2006.
Co-pending U.S. Appl. No. 60/821,165, filed Aug. 2, 2006.
Co-pending U.S. Appl. No. 60/821,956, filed Aug. 9, 2006.
Co-pending U.S. Appl. No. 60/829,127, filed Oct. 11, 2006.

Edwards G.J., et al., "Interpreting Face Images Using Active Appearance Models," Proceedings of the 3rd IEEE International Conference on Face & Gesture Recognition 30 (FG '98), 1998, pp. 300-305.

Final Office Action mailed Mar. 31, 2011, for U.S. Appl. No. 12/206,617, filed Sep. 8, 2008.

Final Office Action mailed May 3, 2011, for U.S. Appl. No. 12/582,415, filed Oct. 20, 2009.

International Search Report for Application No. PCT/EP2010/057492, mailed on Nov. 19, 2010, 5 pages.

Non-Final Office Action mailed May 24, 2011, for U.S. Appl. No. 12/112,586, filed Apr. 30, 2008.

Non-Final Office Action mailed Apr. 29, 2011, for U.S. Appl. No. 12/890,185, filed Sep. 24, 2010.

Notice of Allowance mailed Jun. 9, 2011 for U.S. Appl. No. 12/206,617, filed Sep. 8, 2008.

Notice of Allowance mailed Apr. 14, 2011, for U.S. Appl. No. 11/761,647, filed Jun. 12, 2007.

Patent Abstract of Japan, for publication No. JP 2006-072770, published Mar. 16, 2006, Face Detection Device and Face Direction Estimation Device, 1 page.

PCT Internationl Preliminary Report on Patentability Chapter I (IB/373), for PCT Application No. PCT/EP2009/005461, report dated Feb. 1, 2011, 8 pages.

PCT Notification of Transmittal of the International Search Report and the Written Opinion of the International Searching Authority, or the Declaration, for PCT Application No. PCT/EP2010/059228, dated Nov. 19, 2010, 19 pages.

PCT Written Opinion of the International Search Authority, for PCT Application No. PCT/EP2009/005461, report dated Jan. 30, 2011, 7 pages.

Sun, J. et al., "Flash Matting", ACM Transactions on Graphics, 2006, pp. 772-778, vol. 25—Issue 3.

* cited by examiner

COLOR SEGMENTATION

FIELD OF THE INVENTION

The present invention provides an improved method and apparatus for image processing. In particular the invention provides an improved method of color segmentation, for example face skin segmentation.

SUMMARY OF THE INVENTION

An improved method of face skin segmentation of a digital image is provided. A method of skin segmentation of a digital image is provided which is operable in an image acquisition device. An image is acquired. A value indicative of a redness of a pixel of the image is compared with a face skin pixel redness criterion. The pixel is identified as a face skin pixel if the criterion is satisfied.

The redness criterion may be proportional to the saturation of the pixel. The image may be in RGB colour space, and the value may include the R value of the pixel. The criterion may include R>G+K and R>B+K, and K may be a constant approximately equal to 15, and K may comprise approximately x*(pixel saturation+y), where x is in the range of approximately 0.53 to 0.6; and y is in the range of approximately 5 to 6.5. The pixel saturation may be calculated as: Sqrt($R^2$*0.27847−R*G*0.30610+$G^2$*0.28503−R*B*0.25005+$B^2$*0.25661−G*B*0.26317). The criterion may further comprise an alternate condition that an intensity of said region, 1, is greater than 240.

The image may be in YCC colour space, and the value may include a Cr value of said pixel. The criterion may include Cr>148.8162−0.1626*Cb+0.4726*K and Cr>1.2639*Cb−33.7803+0.133*K, where K may be a constant approximately equal to 15. The criterion may include Cr>148.8162−0.1626*Cb+0.2836*(pixel saturation+5) and Cr>1.2639*Cb−33.7803+0.4279*(pixel saturation+5), where pixel saturation is:

$$\sqrt{((Cr-128)^2+(Cb-128)^2)}$$

The criterion may include an alternate condition that an intensity of said region, Y, is greater than 240. The image may be partitioned into one or more regions of similar colors and wherein said value indicative of a redness of a pixel may include an average pixel value for one of the regions.

The image may be partitioned into one or more regions of pixels having been identified as face skin pixels. The comparing may provide a real value. The method may include providing a contour map of a region comprising the real value. The contour map may be analyzed to locate one or more facial features within a region of face skin pixels. The image may be analyzed to determine one or more candidate face regions. Face detection may be performed on one or more regions of said image, each including a pixel having been identified as a face skin pixel and/or each including one of the regions of face skin pixels.

A computer program product and digital image processing device are further provided in accordance with the above methods.

BRIEF DESCRIPTION OF DRAWINGS

Embodiments of the invention will now be described, by way of example, with reference to the accompanying drawings, in which.

DESCRIPTION OF EMBODIMENTS

It is recognized herein that a primary difference exists between face skin regions and other skin regions in that face skin regions comprise a reddish skin tone. This information is utilized to create an uniquely advantageous color segmentation condition to identify face skin regions within an image.

Figure 1:
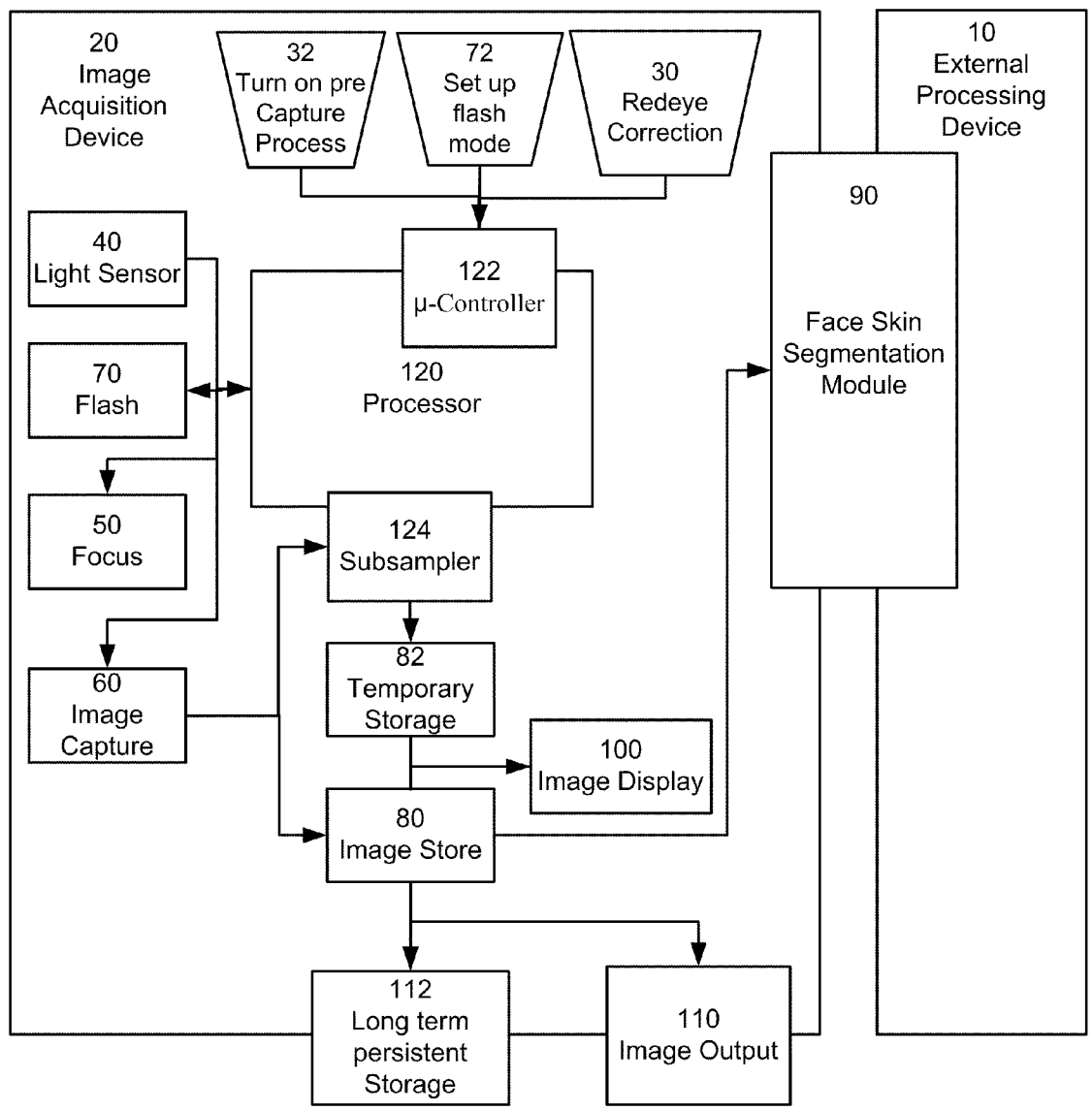
FIG. 1 is a block diagram of a digital camera operating in accordance with embodiments of the present invention.

FIG. 1 is a block diagram of an image acquisition device 20, which in the present embodiment is a portable digital camera, operating in accordance with embodiments of the present invention. It will be appreciated that many of the processes implemented in the digital camera are implemented in or controlled by software operating on a microprocessor, central processing unit, controller, digital signal processor and/or an application specific integrated circuit, collectively depicted as processor 120. All user interface and control of peripheral components such as buttons and display is controlled by a microcontroller 122. The processor 120, in response to a user input at 122, such as half pressing a shutter button (pre-capture mode 32), initiates and controls the digital photographic process. Ambient light exposure is determined using a light sensor 40 in order to automatically determine if a flash is to be used. The distance to the subject is determined using a focusing mechanism 50 which also focuses the image on an image capture device 60. If a flash is to be used, processor 120 causes a flash device 70 to generate a photographic flash in substantial coincidence with the recording of the image by the image capture device 60 upon full depression of the shutter button. The image capture device 60 digitally records the image in colour. The image capture device is known to those familiar with the art and may include a CCD (charge coupled device) or CMOS to facilitate digital recording. The flash may be selectively generated either in response to the light sensor 40 or a manual input 72 from the user of the camera. The high resolution image recorded by image capture device 60 is stored in an image store 80 which may comprise computer memory such a dynamic random access memory or a non-volatile memory. The camera is equipped with a display 100, such as an LCD, for preview images.

In the case of preview images which are generated in the pre-capture mode 32 with the shutter button half-pressed, the display 100 can assist the user in composing the image, as well as being used to determine focusing and exposure. Temporary storage 82 is used to store one or plurality of the preview images and can be part of the image store 80 or a separate component. The preview image is usually generated by the image capture device 60. For speed and memory efficiency reasons, preview images usually have a lower pixel resolution than the main image taken when the shutter button is fully depressed, and are generated by sub-sampling a raw captured image using software 124 which can be part of the general processor 120 or dedicated hardware or combination thereof.

A skin segmentation module 90 can be integral to the camera 20 or part of an external processing device 10 such as a desktop computer, a colour printer or a photo kiosk. In this embodiment, the skin segmentation module 90 receives the captured high resolution digital image from the store 80 and analyzes it to identify regions as face or non-face regions. The is performed according to the principles of the invention as described in the embodiments to follow and the results are made available for pre and/or post processing applications, such as face detection, or face tracking, or eye defect detection and/or correction algorithms. Furthermore, the identified face regions of the image may be either displayed on image display 100, saved on a persistent storage 112 which can be internal or a removable storage such as CF card, SD card or the like, or downloaded to another device via image output means 110 which can be tethered or wireless. The skin segmentation module 90 can be brought into operation either automatically each time an image is acquired, or upon user demand via input 30. Although illustrated as a separate item, where the module 90 is part of the camera it may be implemented by suitable software on the processor 120.

Figure 2:
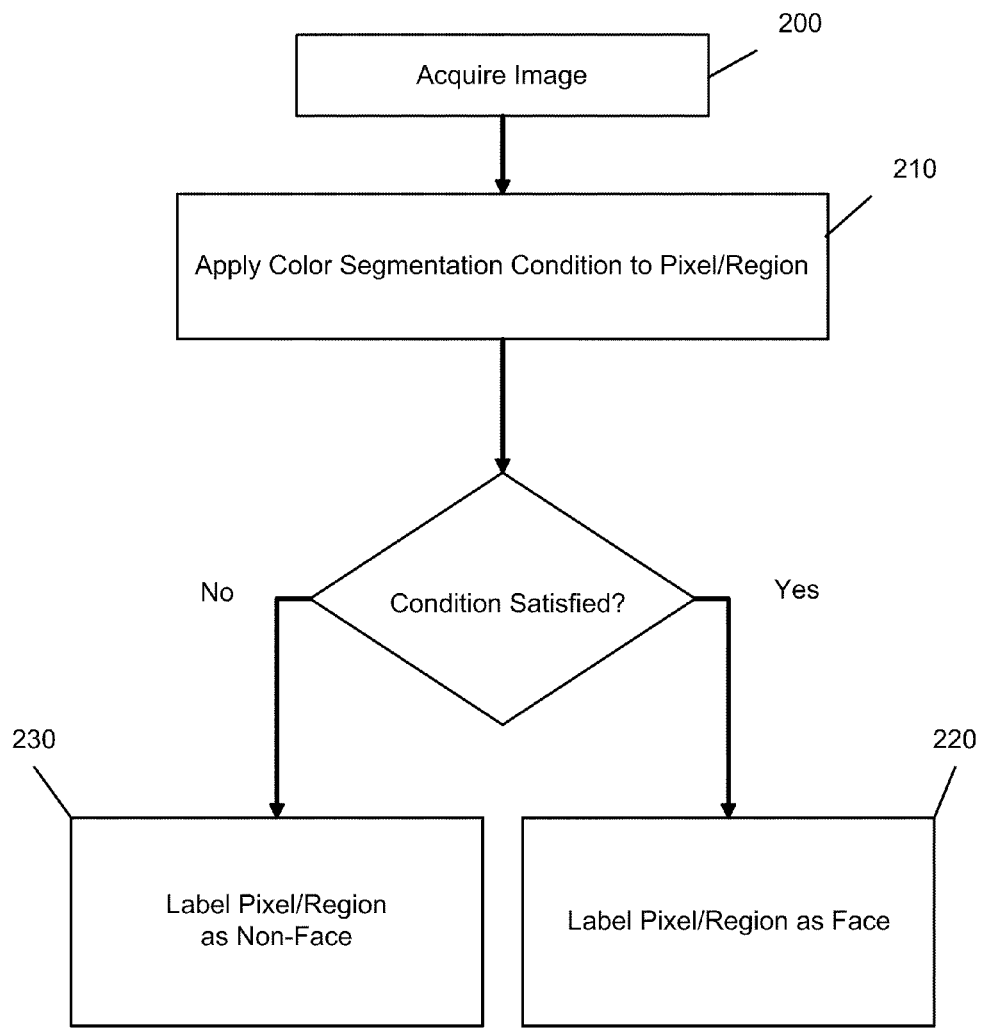
FIG. 2 is a flow diagram of a method according to a preferred embodiment of the invention.

Referring to FIG. 2 of the accompanying drawings, there is depicted a flow diagram illustrating an image processing method according a preferred embodiment of the present invention operable in the skin segmentation module 90 for distinguishing face regions from other regions within an image based on color segmentation.

An image is acquired, 200 from the store 80. In a first, second and third embodiment, a color segmentation condition is implemented as a Boolean function, which returns an indicator of whether or not the condition is satisfied. So for any input pixel, the color segmentation condition is applied to the pixel 210, and if the pixel satisfies the condition, the pixel is labeled as a face skin pixel 220, otherwise, the pixel is labeled as a non-face skin pixel 230. This function can be applied until all pixels have been labeled to produce a map of face and non-face skin pixels for the image.

Within the map, face skin regions can then be defined by linking pixels classified as comprising face skin. These regions can be bounded by rectangles which are then used to designate potential face regions.

In an alternative embodiment, the image may be partitioned initially into regions of similar colors to form a color map as disclosed in U.S. Pat. No. 6,661,907, incorporated by reference, or in any other suitable manner. In such an embodiment, the color segmentation condition is applied to a representative pixel color from each region to define the region as a face skin region or not. In a first embodiment of the invention, where the image is in RGB color space, the color segmentation condition is represented as:

$R>G+K$ and $R>B+K$

The corresponding color segmentation condition in YCC space is:

$Cr>148.8162-0.1626*Cb+0.4726*K$ and $Cr>1.2639*Cb-33.7803+0.7133*K$

In both RGB and YCC space, K is a constant and is approximately equal to 15.

In a second embodiment of the present invention, K is a function of saturation of a pixel or region and is defined as:

$K=x*(\text{pixel/region saturation}+y)$ where x is in the range of approximately 0.53 to 0.6; and
y is in the range of approximately 5 to 6.5

The difference between the red plane, R, and both the green, G and blue, B planes is directly proportional to the saturation level of the image. Thus the color segmentation condition in this embodiment varies dynamically with exposure.

In RGB space, the pixel/region saturation is the average of pixel saturation in a region and defined as:

$\text{Sqrt}(R^2*0.27847-R*G*0.30610+G^2*0.28503-R*B*0.25005+B^2*0.25661-G*B*0.26317)$ In YCC space, the condition changes to:

$Cr>148.8162-0.1626*Cb+0.2836*(\text{pixel/region saturation}+5)$ and $Cr>1.2639*Cb-33.7803+0.4279*(\text{pixel/region saturation}+5)$ where pixel/region saturation is defined as:

$\sqrt{((Cr-128)^2+(Cb-128)^2)}$

In the third embodiment, the color segmentation condition is represented in RGB color space as:

$R>G+K$ and $R>B+K$ or $I>240$ where $I=0.3R+0.59G+0.11B$

The corresponding color segmentation condition in YCC space is:

$Cr>148.8162-0.1626*Cb+0.4726*K$ and $Cr>1.2639*Cb-33.7803+0.7133*K$ or $Y>240$ where K constant or with corresponding changes where K is dependent on pixel/region saturation.

The additional condition that the intensity is greater than 240 is added to ensure that portions of the face that are overexposed are included in the resulting face-map, when, for example, chrominance information is destroyed and luminance levels are high.

Using this embodiment, "skin segmentation" is automatically adjusted as a function of the saturation of the image. For example if the image is very saturated (pixel/region saturation is large), the distance between the planes R&G and R&B will be large and so the formula which provides skin segmentation is R>G+K(big) and R>B+K(big). When saturation is very small, the color planes are very close, i.e. R≅G≅B, so the formula which provides skin segmentation is R>G+K(small) and R>B+K(small).

In a further embodiment of the present invention, the color segmentation condition is implemented as a real valued function, which returns a value indicative of an orthogonal distance of a pixel from the condition test plane(s). According to the basis of the present invention, i.e. that face regions comprise a reddish skin tone, the further the pixel from the test plane, the more face-like the pixel. Thus, pixels neighboring eye sockets, for example, are likely to be less red and therefore, have lower (possibly negative) orthogonal distance values. Correspondingly, pixels located around a cheek area of the face will have higher orthogonal distance values. In this way, a contour map of a face is produced.

Figure 3:
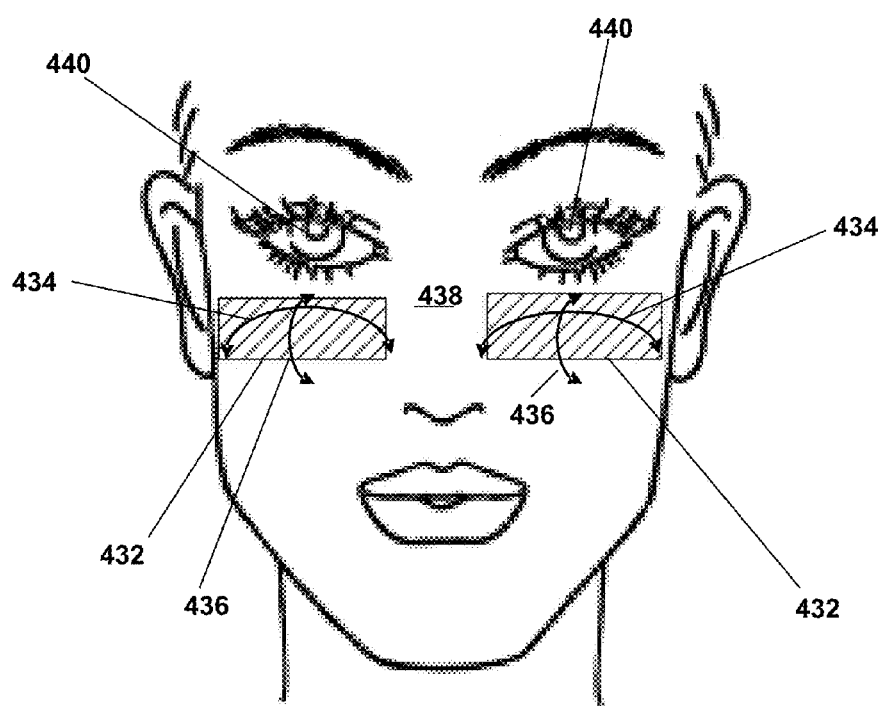
FIG. 3 shows a face including contours defined according to an embodiment of the present invention.

So referring to FIG. 3, for an image containing a face as outlined, using real valued skin segmentation, there should be produced two peaked regions 432 corresponding to cheeks within a face region of an image. Contours 434 in one direction can be use to locate a nose 438, whereas contours 436 in another direction can be used to indicate the location of eye sockets 440. Combinations of contours and other contour information from other face skin regions can be used to quickly direct a face feature detection algorithm to other face features such as eyebrows, mouth, chin etc.

All of the embodiments described above may be incorporated into or cooperate with further image processing techniques, such as face detection, face tracking, red-eye detection and correction and the like. For example, U.S. patent application Ser. No. 11/464,083, filed Aug. 11, 2006, which is hereby incorporated by reference, relates to an improved method of face tracking in a digital image (see also, US published applications nos. 2006/0204110 and U.S. application 60/821,165, as well as US published applications nos. 2005/0041121 and 2005/0140801, which are all incorporated by reference, wherein the latter two applications may be combined with the color segmentation described herein for identifying face skin pixels as distinguished from red eye pixels). The present invention can be used to quickly determine the location of potential face regions to enable the system of U.S. patent application Ser. No. 11/464,083 to limit the regions of an image to which more sophisticated face detection needs to be applied. Alternatively, the face contour technique described above can be used within face regions detected with the system of U.S. patent application Ser. No. 11/464,083 to more quickly identify and locate specific facial features for use in further processing, for example, to determine if the subject is blinking, smiling etc.

A method of color segmentation in a digital image to aid face detection may be combined with methods described above or claimed below in an alternative embodiment (see, e.g., U.S. Pat. No. 6,661,907, which is incorporated by reference). The method may involve partitioning the image into color regions by seeking connected groups of pixels of similar colors over a local region and representing each region by an average color value of that region in RGB color space to produce a color map. A chromatic characteristic of the average color value pixel for each region may be compared with a threshold and the regions may be identified as either skin or non-skin regions accordingly. The identified skin regions may then be further analyzed to detect face characteristics.

The invention is not limited to the embodiments described herein which may be modified or varied without departing from the scope of the invention, as set forth in the claims below, and structural and functional equivalents thereof Also in methods described above and/or claimed below, the elements need not be performed only in the order recited.

The invention claimed is:

1. A method of skin segmentation of a digital image, said method operable in an image acquisition device, comprising:
acquiring an image, including focusing an object through a lens onto an image sensor of an image acquisition device;
using a processor to compare
a value indicative of a redness of a pixel of said image with a face skin pixel redness criterion; and to identify
said pixel as a face skin pixel if said criterion is satisfied, and
wherein said image is in RGB colour space, and wherein said value comprises the R value of said pixel, and
wherein said criterion comprises R>G+K and R>B+K, and
wherein said criterion further comprises that an intensity of said pixel, I, is greater than 240.

2. A method as claimed in claim 1, where K is a constant approximately equal to 15 or higher.

3. A method of skin segmentation of a digital image, said method operable in an image acquisition device, comprising:
acquiring an image, including focusing an object through a lens onto an image sensor of an image acquisition device;
using a processor to compare
a value indicative of a redness of a pixel of said image with a face skin pixel redness criterion and to identify
said pixel as a face skin pixel if said criterion is satisfied, and
wherein said image is in RGB colour space, and wherein said value comprises the R value of said pixel, and
wherein said criterion comprises R>G+K and R>B+K, where K comprises approximately $$x*(\text{pixel saturation}+y)$$

where x is in the range of approximately 0.53 to 0.6; and y is in the range of approximately 5 to 6.5.

4. The method of claim 3 comprising calculating said pixel saturation as:

$$\text{Sqrt}(R^2*0.27847-R*G*0.30610+G^2*0.28503-R*B*0.25005+B^2*0.25661-G*B*0.26317).$$

5. A method of skin segmentation of a digital image, said method operable in an image acquisition device, comprising:
acquiring an image, including focusing an object through a lens onto an image sensor of an image acquisition device;
using a processor to compare
a value indicative of a redness of a pixel of said image with a face skin pixel redness criterion and to identify
said pixel as a face skin pixel if said criterion is satisfied, and
wherein said image is in YCC colour space, and wherein said value is a Cr value of said pixel, and
wherein said criterion comprises:

$$Cr>148.8162-0.1626*Cb+0.4726*K \text{ and}$$

$$Cr>1.2639*Cb-33.7803+0.133*K.$$

6. The method of claim 5 where K is a constant approximately equal to 15 or higher.

7. A method of skin segmentation of a digital image, said method operable in an image acquisition device, comprising:
acquiring an image, including focusing an object through a lens onto an image sensor of an image acquisition device;
using a processor to compare
a value indicative of a redness of a pixel of said image with a face skin pixel redness criterion and to identify
said pixel as a face skin pixel if said criterion is satisfied, and
wherein said image is in YCC colour space, and wherein said value is a Cr value of said pixel, and
wherein said criterion comprises:

$$Cr>148.8162-0.1626*Cb+0.2836*(\text{pixel saturation}+5) \text{ and}$$

$$Cr>1.2639*Cb-33.7803+0.4279*(\text{pixel saturation}+5)$$

where pixel saturation is:

$$\sqrt{((Cr-128)^2+(Cb-128)^2)}.$$

8. A method of skin segmentation of a digital image, said method operable in an image acquisition device, comprising:
acquiring an image, including focusing an object through a lens onto an image sensor of an image acquisition device;
using a processor to compare
a value indicative of a redness of a pixel of said image with a face skin pixel redness criterion and to identify
said pixel as a face skin pixel if said criterion is satisfied, and
wherein said image is in YCC colour space, and wherein said value is a Cr value of said pixel, and
wherein said criterion further comprises an alternate condition that an intensity of said pixel, Y, is greater than 240.

9. A method as claimed in any of claim 2, 3, 1, 5, 7 or 8, wherein the redness criterion is proportional to the saturation of the pixel.

10. The method of any of claim 2, 3, 1, 5, 7 or 8, further comprising partitioning said image into one or more regions of similar colors and wherein said value indicative of a redness of a pixel comprises an average pixel value for one of said one or more regions.

11. The method of any of claim 2, 3, 1, 5, 7 or 8, further comprising partitioning said image into one or more regions of pixels having been identified as face skin pixels.

12. The method of any of claim 2, 3, 1, 5, 7 or 8, wherein said comparing provides a real value and wherein said method comprises providing a contour map of a region comprising said real value.

13. The method of claim 12 further comprising analyzing said contour map to locate one or more facial features within a region of face skin pixels.

14. The method of claim 12 further comprising analyzing said image to determine one or more candidate face regions and wherein said region that comprises said real value comprises one of said candidate face regions.

15. The method of claim 10 further comprising performing face detection on one or more regions of said image, each including a pixel having been identified as a face skin pixel.

16. The method of claim 11, further comprising performing face detection on one or more regions of said image, each including one of said one or more regions of face skin pixels.

17. A non-transitory, tangible computer program product comprising computer program code which when executed on a computing device is arranged to perform the method of any of claim 2-1 or 5-8.

18. A digital image processing device comprising a controller arranged to perform the method of any of claim 2-1 or 5-8.

* * * * *